(12) United States Patent
Kunz et al.

(10) Patent No.: US 12,383,880 B2
(45) Date of Patent: Aug. 12, 2025

(54) PRECIOUS METAL NANOPARTICLES

(71) Applicant: Heraeus Deutschland GmbH & Co. KG, Hanau (DE)

(72) Inventors: Sebastian Kunz, Monsheim (DE); Matthias Arenz, Bern (CH); Jonathan Quinson, Gouezec (FR); Laura Kacenauskaite, Vilnius (LT)

(73) Assignee: Heraeus Deutschland Gmbh & Co. KG, Hanau (DE)

( * ) Notice: Subject to any disclaimer, the term of this patent is extended or adjusted under 35 U.S.C. 154(b) by 866 days.

(21) Appl. No.: 16/464,773

(22) PCT Filed: Nov. 29, 2017

(86) PCT No.: PCT/EP2017/080801
§ 371 (c)(1),
(2) Date: May 29, 2019

(87) PCT Pub. No.: WO2018/099958
PCT Pub. Date: Jun. 7, 2018

(65) Prior Publication Data
US 2019/0308155 A1    Oct. 10, 2019

(30) Foreign Application Priority Data
Nov. 30, 2016 (EP) .................... 16201377

(51) Int. Cl.
*B01J 23/42* (2006.01)
*B01J 13/00* (2006.01)
*B01J 23/44* (2006.01)
*B01J 23/46* (2006.01)
*B01J 35/23* (2024.01)
(Continued)

(52) U.S. Cl.
CPC .......... *B01J 35/23* (2024.01); *B01J 13/0013* (2013.01); *B01J 13/0043* (2013.01); *B01J 23/42* (2013.01); *B01J 23/44* (2013.01); *B01J 23/462* (2013.01); *B01J 23/468* (2013.01); *B01J 35/393* (2024.01); *B01J 35/40* (2024.01); *B01J 37/0211* (2013.01);
(Continued)

(58) Field of Classification Search
CPC .... B01J 13/0043; B01J 13/0013; B01J 23/42; B01J 23/44; B01J 23/462; B01J 23/468; B01J 35/0013; B01J 35/006; B01J 35/023; B01J 37/0211; B01J 37/16; B22F 1/0545; B22F 9/24; B22F 2301/25
See application file for complete search history.

(56) References Cited

U.S. PATENT DOCUMENTS 8,962,512 B1 * 2/2015 Burton ................... B01J 35/006
502/185
9,550,170 B2 * 1/2017 Wang ...................... C25B 11/04
(Continued)

OTHER PUBLICATIONS

Javed et al (J Nanobiotechnol (2020) 18:172) (Year: 2020).*
(Continued)

*Primary Examiner* — Jiangtian Xu

(57) ABSTRACT

A method for preparing a colloidal dispersion of precious metal nanoparticles free of organic adsorbates that have a molar weight above 100 g/mol, the colloidal dispersion of the precious metal nanoparticles obtained by the method according to the invention, solid and re-dispersed precious metal nanoparticles and products comprising colloidally dispersed or solid precious metal nanoparticles.

10 Claims, 15 Drawing Sheets

(51) Int. Cl.
  *B01J 35/30* (2024.01)
  *B01J 35/40* (2024.01)
  *B01J 37/02* (2006.01)
  *B01J 37/16* (2006.01)
  *B22F 1/0545* (2022.01)
  *B22F 9/24* (2006.01)

(52) U.S. Cl.
  CPC ............. *B01J 37/16* (2013.01); *B22F 1/0545* (2022.01); *B22F 9/24* (2013.01); *B22F 2301/25* (2013.01)

(56) References Cited

U.S. PATENT DOCUMENTS

| | | | | |
|---|---|---|---|---|
| 2009/0004098 | A1* | 1/2009 | Schmidt | C04B 35/486 423/608 |
| 2013/0264198 | A1* | 10/2013 | Wang | C25B 1/04 204/290.14 |
| 2014/0299821 | A1* | 10/2014 | Rudhardt | B22F 1/0545 252/514 |
| 2015/0236354 | A1* | 8/2015 | Binder | H01M 4/925 502/159 |
| 2019/0308155 | A1* | 10/2019 | Kunz | B01J 35/006 |

OTHER PUBLICATIONS

Oxford Dictionary of Chemistry (Oxford University Press, 2016) (Year: 2016).*
International Search Report and Written Opinion issued in PCT/EP2017/080801, mailed Feb. 8, 2018; ISA/EP.
Article entitled: Preparation of Tractable Platinum, Rhodium, and Ruthenium Nanoclusters with Small Particle Size in Organic Media, authored by: Yuan Wang, Jiawen Ren, Kai Deng, Linlin Gui, and Youqi Tang, dated Apr. 4, 2000, Peking University, Beijing, China (6 pages).
Tetrahedron Letters 49 (2008) entitled: Facile Synthesis of Palladium Nanoclusters and their catalytic Activity in Sonogashira Coupling Reactions, authored by J. Athilakshmi, S. Ramanathan, and Dillip Kumar Chard, India (3 pages).
Chemistry Letters entitled: Colloidal Rhodium in Poly (vinylpyrolidone) as Hydrogensation Catalyst for Internal Olefins, authored by: Hidefumi Hirai, Yukimichi Nakao and Naoki Toshima (1978) (4 pages).
Article entitled: Modified Polyol Method for a Highly Allowed PtRu/C electrocatalyst: Effect of Hot Injection of Metal Precursor and NaOH, authored by In-Hwan Ko, Weon-Doo Lee, Ji Yeon Baek, Yung-Eun Ssung, and Ho-In Lee, (2010) (7 pages).

* cited by examiner

PRECIOUS METAL NANOPARTICLES

CROSS-REFERENCE TO RELATED APPLICATIONS

This application is a 371 U.S. National Stage of International Application No. PCT/EP2017/080801, filed Nov. 29, 2017, which claims priority to European Patent Application No. 16201377.5, filed Nov. 30, 2016. The entire disclosures of the above applications are incorporated herein by reference.

The present invention relates to a method for preparing a colloidal dispersion of precious metal nanoparticles free of organic adsorbates that have a molar weight above 100 g/mol, the colloidal dispersion of the precious metal nanoparticles obtained by the method according to the invention, solid and re-dispersed precious metal nanoparticles and products comprising colloidally dispersed or solid precious metal nanoparticles.

BACKGROUND ART

Precious metal nanoparticles are widely used for the catalysis of chemical reactions and in electronic applications. Further suitable application areas are medical therapies, sensing or imaging. Due to the high price of precious metals used in the preparation of the nanoparticles there is a constant need for fast, simple and economic methods for the preparation of precious metal nanoparticles.

In the prior art, the preparation of supported nanoparticles, for e. g. catalytic application, is mainly based on impregnation of a support material. In this method the precursor of a desired active metal is deposited on a support material followed by subsequent oxidation and reduction treatments using high temperature to achieve formation and activation of the nanoparticles on the support. One of the disadvantages of such process is that particle load on the support and particle size cannot be optimized independently. It is further observed that the properties of the support material affect the particle size resulting in an undesirably broad particle size distribution. Due to the inhomogeneous surface of the support particles are also formed in small pores of the support material which reduces their accessibility, thus lowering the overall catalytic activity. Furthermore, the impregnation method often requires to conduct multiple impregnation steps in case a high load of the active material on the support is desired. Moreover, subjecting the support and the precursor of the desired active metal to high temperature thermal treatments can change the chemical properties of the supported nanoparticles.

One way to overcome the limitations of the impregnation method is to conduct catalyst preparation in two separate steps. Thereby the nanoparticles are prepared in a first step and subsequently deposited onto the desired support material in a second step. One strategy in the prior art to achieve this separation is the use of colloidal nanoparticle dispersions. These nanoparticles are prepared in aqueous or organic solvents by the reduction of metal precursors which enables for tuning the particle properties (e. g. size) in the absence of a support material. The thereby obtained nanoparticles can then be deposited on any desired support by removal of the solvent. In this method the load of particles on the support can easily be controlled by adjusting the ratio of nanoparticles to support material during the deposition process. In this way very high particle loads and a constant, small particle size can be achieved.

However, the methods used in the prior art to obtain colloidal nanoparticles are still facing various limitations. Usually surfactants containing binding groups (e. g. amines, phosphines or thiols) are used in order to obtain nanoparticles which are not subjected to sintering.

Hirai et al. (Colloidal Rhodium in Poly(vinylpyrrolidone) as Hydrogenation Catalyst for Internal Olefins, Chemistry Letters, 1978, pgs. 545-548) discloses the preparation of colloidal rhodium in poly(vinylpyrrolidone) (PVP) as hydrogenation catalyst for olefins. This document discloses the use of the polymer PVP to produce colloidal rhodium suitable as a hydrogenation catalyst. It is taught that in presence of PVP stable colloidal dispersions are obtainable, while in the absence of PVP only precipitates of rhodium could be obtained. Thus, no stable colloidal dispersions of rhodium could be obtained in the absence of polymer and furthermore the obtained black precipitate was not re-dispersible e.g. in methanol or aqueous solutions.

Further, if nanoparticles are intended for use in catalytic applications surfactants used for nanoparticle synthesis have to be removed after particle deposition. Surfactant removal requires strongly oxidizing treatments that may irreversibly alter the material properties. Furthermore, the surfactants used can be toxic and often strong and hazardous reducing agents have to be applied for particle preparation which causes safety issues and may limit scalability and/or reproducibility of the preparation methods. As a further drawback deposition and polymer removal often involves additional energy costs and leads to chemical waste. Moreover, the solvents used in the process of preparing colloidal nanoparticles disadvantageously cannot be re-used without cost-consuming processing.

In an approach to overcome the aforementioned problems and limitations Wang et al. (Preparation of Tractable Platinum, Rhodium, and Ruthenium Nanoclusters with Small Particle Size in Organic Media, Chem. Matter, 2000, 12, pgs. 1622-1627) could show that Pt, Ru and Rh nanoparticles within a size range of 1 to 2 nm and with sharp particle size distribution can be obtained without using strongly binding surfactants. In said process the reaction proceeds in alkaline ethylene glycol (EG) at temperatures around 160° C., wherein EG acts as the reducing agent and solvent. In order to deposit these nanoparticles on a support the solvent (EG) has to be removed, which can be challenging, as EG exhibits a very low vapour pressure and high boiling temperature. To overcome that problem the obtained nanoparticles can be precipitated and washed with strong acids, typically HCl. The thereby obtained nanoparticles can subsequently be re-dispersed in organic solvents having a high vapour pressure (e.g. acetone) from which the nanoparticles can be deposited onto any given substrate. This can be achieved by bedding the particle dispersion to the desired substrate and removing the solvent by solvent evaporation. In this way materials can be prepared that are applicable as e.g. heterogeneous catalysts, electrocatalysts, and furthermore suitable for sensing devices.

Alternatively, the particles can be prepared directly in the presence of a support material with the aforementioned drawback that a complete removal of EG is required. In particular for technical applications the use of surfactant-free nanoparticles prepared according to the method of Wang et al. is not practical for various reasons.

As the method requires precipitation and re-dispersion of the particles prior to deposition on a support material, additional preparation steps are necessary which increases the preparation effort. These additional steps lead to accessory costs, energy demand and waste. Furthermore the use of HCl for precipitation of the nanoparticles is undesired, as chloride is known to act as a catalyst poison. Moreover, the use of HCl was shown to limit the re-dispersibility of the nanoparticles in solvents of technical interest, such as methanol or water.

To minimise the need for precipitation by strong acids and avoid further washing steps to remove high boiling point solvents like EG, U.S. Pat. No. 8,962,512 B1 discloses a method for the synthesis of palladium (Pd) nanoparticles by alcohol-assisted photoreduction for use in supported catalysts. In the disclosed method the organic precursor palladium acetate ($Pd(OAc)_2$) is reacted with an alcohol under ambient temperature conditions in the absence of polymers and in absence of a base. The thereby obtained nanoparticles precipitate quickly (within a few days) and the nanostructures formed start to sinter.

The technical problem underlying the present invention is thus to provide methods to prepare precious metal nanoparticles which overcome the above-identified disadvantages and limitations and which allow in an easy, efficient and reliable way to produce precious metal nanoparticles, in particular those which provide unexpected advantages over nanoparticles prepared according to the methods known in the prior art. Thus, the present invention is also based on the technical problem to provide precious metal nanoparticles with improved properties, in particular which show an increased stability and/or an improved ability to be re-dispersed in various media, in particular aqueous media and organic solvents, in particular low boiling organic solvents, in particular methanol, ethanol, propanol, alcohol mixtures or mixtures of alcohols and water.

The present invention overcomes the disadvantages and limitations in the prior art by the subject-matter of the independent claims, in particular by the provision of a method for the preparation of precious metal nanoparticles in at least one mono-alcoholic solvent system and at least one base and the nanoparticles obtainable thereby.

In particular, the use of inorganic precursors for the precious metal nanoparticle containing the specific presently selected precious metals in combination with the mono-alcohols or mixtures of mono-alcohols with water in the presence of at least one base advantageously enables to overcome the above described limitations of conventional catalyst preparation methods as well as those for nanoparticles prepared in diols, polyols or with surfactants.

The present invention, thus, relates to a method for preparing precious metal nanoparticles, which nanoparticles are free of organic adsorbates that have a molar weight above 100 g/mol, by employing at least one inorganic precursor for the precious metal nanoparticle, at least one mono-alcoholic solvent system and at least one base. In the method according to the present invention the at least one base is added, preferably as a stabilizer, instead of the surfactants, e.g. polymers, used in the prior art. In the at least one mono-alcoholic solvent system the at least one mono-alcohol acts preferably as a mild reducing agent enabling the reduction of the nanoparticle precursor to the nanoparticle. Advantageously and in preferred embodiments, the preparation of the precious metal nanoparticles can be achieved at ambient temperatures in the presence of daylight or by using thermal energy, in particular heat, or light sources such as UV-lamps. In addition, it is also possible to combine thermal energy, in particular heat, and light to obtain the nanoparticles.

The present inventors surprisingly found that the present method for preparing precious metal nanoparticles free of organic adsorbates that have a molar weight above 100 g/mol allows for the production, in particular isolation, of precious metal nanoparticles either as stable colloidal dispersions or as wet or dry solid powders by removal of the solvent. In contrast to colloidal nanoparticles in the prior art the colloidal nanoparticles obtained by the method according to the present invention can directly be applied to coat substrates, e.g. catalyst supports or used for the preparation of unsupported materials, e.g. catalysts. The nanoparticles obtained as solids can advantageously be re-dispersed in various organic media, in particular methanol, or in aqueous media, e.g. aqueous solvents and aqueous saline solutions of different pH values within a range of 2.5 to 12.5, wherein particle size and catalytic activity are maintained after re-dispersion. Preferably, they can be re-dispersed in both, i.e. organic media and aqueous media, wherein particle size and catalytic activity are maintained after re-dispersion. The high stability of the colloidal dispersion and the solid nanoparticles prepared according to the method of the present invention enables for long-term storage of the nanoparticles and subsequent re-use. The supported and unsupported nanoparticles prepared by the method according to the present invention can be applied as e. g. heterogeneous catalysts for hydrogenation and oxidation reactions, electrocatalytic applications such as in fuel cells or electrolysis, or for sensing devices. Furthermore, the possibility to re-disperse the obtained solid precious metal nanoparticles in aqueous media enables for use in e. g. bio-medical applications, in particular therapy or imaging.

In particular, the present invention relates to a method for preparing precious metal nanoparticles free of organic adsorbates that have a molar weight above 100 g/mol, in particular a colloidal dispersion of precious metal nanoparticles free of organic adsorbates that have a molar weight above 100 g/mol, comprising the steps:
  a) providing at least one inorganic precursor for the precious metal nanoparticle, at least one mono-alcoholic solvent system and at least one base, wherein at least one precious metal is selected from the group consisting of Pt, Pd, Ir and Ru and the at least one mono-alcohol in the at least one mono-alcoholic solvent system is methanol, ethanol or propanol,
  b) mixing the at least one inorganic precursor for the precious metal nanoparticle, at least one mono-alcoholic solvent system and the at least one base in the absence of polymers, ligands, capping agents and surfactants, thereby obtaining a reaction mixture, so as to reduce the at least one inorganic precursor for the precious metal nanoparticle with the at least one mono-alcoholic solvent system, and
  c) obtaining the precious metal nanoparticles free of organic adsorbates that have a molar weight above 100 g/mol, in particular the colloidal dispersion of precious metal nanoparticles free of organic adsorbates that have a molar weight above 100 g/mol.

In a preferred embodiment the precious metal nanoparticles obtained in step c) are obtained as nanoparticles being dispersed in the reaction mixture, thus, being in the form of a colloidal dispersion or can be obtained as solid precious metal nanoparticles, preferably being sedimented from the reaction mixture or as a mixture of both of these.

In a preferred embodiment the obtained colloidal dispersion can be subjected to solvent removal to obtain wet or dried solid precious metal nanoparticles.

In another embodiment the obtained sedimented solid form can be used as it is, or in wet or dried solid form.

The method according to the present invention advantageously allows the preparation of precious metal nanoparticles, in particular a colloidal dispersion of precious metal nanoparticles, in a one-step process. That means the at least one inorganic precursor for the precious metal nanoparticle, the at least one mono-alcoholic solvent system and the at least one base provided in step a) are all mixed together in step b) at the same time to obtain a reaction mixture in which the at least one inorganic precursor for the precious metal nanoparticle is fully reduced to directly obtain precious metal nanoparticles free of organic adsorbates that have a molar weight above 100 g/mol, in particular a colloidal dispersion of precious metal nanoparticles free of organic adsorbates that have a molar weight above 100 g/mol, and thus, without conducting further sub-steps, e.g. the sequential addition or removal of components. The precious metal nanoparticles obtained in step c), in particular the precious metal nanoparticles in the colloidal dispersion obtained in step c), can subsequently be isolated as wet or dried solid precious metal nanoparticles, which are characterized by being re-dispersible in organic solvents.

In a preferred embodiment of the present invention the method for preparing precious metal nanoparticles free of organic adsorbates that have a molar weight above 100 g/mol is a method for preparing mono-metallic precious metal nanoparticles. In this embodiment all of the inorganic precursors for the precious metal nanoparticle provided in step a) are precursors which contain solely one of the precious metals selected from the group consisting of Pt, Pd, Ir and Ru.

In a preferred embodiment of the present invention the method for preparing precious metal nanoparticles free of organic adsorbates that have a molar weight above 100 g/mol is characterized in that in step a) a first and a second inorganic precursor for the precious metal nanoparticle is provided and the metal in the first precursors for the precious metal nanoparticle is selected from the group consisting of Pt, Pd, Ir and Ru, and wherein the metal in the first precursor for the precious metal nanoparticle differs from the metal in the second precursor for the precious metal nanoparticle, so as to obtain bi-metallic precious metal nanoparticles.

In a preferred embodiment of the present invention the method for preparing precious metal nanoparticles free of organic adsorbates that have a molar weight above 100 g/mol is characterized in that in step a) a first and a second inorganic precursor for the precious metal nanoparticle is provided and the metal in the first precursor for the precious metal nanoparticle is selected from the group consisting of Pt, Pd, Ir and Ru and the metal in the second precursor for the precious metal nanoparticle is selected from the group consisting of Pt, Pd, Ir, Ru, Rh, Cu, Co, Y, Fe, Zn, Ni, Sn, Bi, Au, Ag, and wherein the metal in the first precursor for the precious metal nanoparticle differs from the metal in the second precursor for the precious metal nanoparticle, so as to obtain bi-metallic precious metal nanoparticles.

In a preferred embodiment of the present invention the method for preparing precious metal nanoparticles free of organic adsorbates that have a molar weight above 100 g/mol is characterized in that in step a) a first and a second inorganic precursor for the precious metal nanoparticle is provided and the precious metal in the first precursor for the precious metal nanoparticle is selected from the group consisting of Pt, Pd, Ir and Ru and the precious metal in the second precursor for the precious metal nanoparticle is selected from the group consisting of Pt, Pd, Ir, Ru and Rh, and wherein the precious metal in the first precursor for the precious metal nanoparticle differs from the precious metal in the second precursor for the precious metal nanoparticle, so as to obtain bi-metallic precious metal nanoparticles.

In a further preferred embodiment of the present invention, in step a) at least one support is provided and step b) is conducted in the presence of the at least one support, so as to obtain in step c) supported precious metal nanoparticles free of organic adsorbates that have a molar weight of above 100 g/mol.

In one embodiment of the present invention the process is carried out in absence of a support, that means in step a) and in step b) no support is used, thus, providing free, that means unsupported precious metal nanoparticles.

In a preferred embodiment of the present invention the at least one inorganic precursor for the precious metal nanoparticle is selected from metal halides and metal nitrates, preferably metal halides, preferably metal nitrates. Preferably, the at least one inorganic precursor for the precious metal nanoparticle is selected from $H_2PtCl_6 \cdot xH_2O$, $K_2PdCl_4$, $Pd(H_2NCH_2CH_2NH_2)Cl_2$, $PdCl_2$, $PdBr_2$, $PdI_2$, $Pd(NH_3)_4Br_2$, $Pd(NH_3)_4Cl_2$, dichloro(cycloocat-1,5-diene)platinum(II), $K[PtCl_3(C_2H_4)] \cdot H_2O$, Cisplatinum, $K_2PtCl_4$, $PtCl_4$, $PtCl_2$, $PtBr_2$, $PtI_2$, $Pt(NH_3)_2Cl_4$, $Pt(NH_3)_2Cl_2$, $H_2PtBr_6 \cdot xH_2O$, $H_{15}Cl_2N_5Ru$, $[Ru(NH_3)_6]Cl_2$, $[Ru(NH_3)_5Cl]Cl_2$, $RuI_3$, $Ru(NO)Cl_3 \cdot xH_2O$, $RuCl_3 \cdot xH_2O$, $IrCl_2$, $[(C_5(CH_3)_5IrCl)]_2$, $H_2Cl_6Ir \cdot xH_2O$, $IrBr_3 \cdot xH_2O$, $IrCl_4$, $IrCl_3 \cdot xH_2O$, $[Ir(NH_3)_5Cl]Cl_2$, and a combination thereof, preferably consists of one or more of these.

In a preferred embodiment of the present invention the concentration of the at least one inorganic precursor for the precious metal nanoparticle in the reaction mixture obtained in step b) is in a range of 0.1 mM to 25 mM, preferably 0.1 mM to 10 mM, preferably 0.2 mM to 5 mM, preferably 0.25 mM to 4 mM, preferably 0.4 mM to 3 mM, preferably 0.5 mM to 2.5 mM.

In a further preferred embodiment of the present invention the concentration of the at least two inorganic precursors for precious metal nanoparticle in the reaction mixture obtained in step b) is in a range of 0.1 mM to 25 mM, preferably 0.1 mM to 10 mM, preferably 0.1 mM to 5 mM, preferably 0.2 mM to 4 mM, preferably 0.25 mM to 3 mM, preferably 0.5 mM to 2.5 mM.

In a preferred embodiment of the present invention the at least one inorganic precursor for the precious metal nanoparticle is pre-treated by exposition to UV irradiation after dissolving in the at least one mono-alcoholic solvent system but prior to addition of the at least one base. Preferably, pre-treatment of the at least one inorganic precursor for the precious metal nanoparticle by exposition to UV irradiation enhances the reaction rate by a factor of at least 1.5, preferably at least 2, preferably at least 3, preferably at least 4, preferably at least 5.

In a preferred embodiment of the present invention the at least one mono-alcoholic solvent system comprises, preferably consists of, at least one mono-alcohol or a mixture of at least one mono-alcohol and water. The ratio (volume:volume) of the at least one mono-alcohol to water in the at least one mono-alcoholic solvent system is preferably 100:0 to 5:95, preferably 90:10 to 5:95, preferably 80:20 to 5:95, preferably 70:30 to 5:95, preferably 50:50 to 5:95. Preferably, the ratio is 100:0, preferably 90:10, preferably 80:20, preferably 70:30, preferably 50:50, preferably 20:80, preferably 12.5:87.5, preferably 5:95. Preferably, the water content in the at least one mono-alcoholic solvent system does not exceed 95%. Preferably, the mono-alcohol content in the at least one mono-alcoholic solvent system is not below 5%.

According to the present invention the at least one mono-alcohol in the at least one mono-alcoholic solvent system is a low-boiling point mono-alcohol selected from methanol, ethanol or propanol. Preferably, the at least one mono-alcohol is ethanol or methanol, more preferably the at least one mono-alcohol in the at least one mono-alcoholic solvent system is methanol.

In a preferred embodiment of the present invention the method, in particular steps a) and b), for preparing precious metal nanoparticles is conducted without the use of inert gas.

Preferably, the method, in particular steps a) and b), for preparing precious metal nanoparticles is not conducted under anhydrous conditions.

Preferably, the method, in particular steps a) and b), does not comprise the use of inert gas and/or anhydrous conditions.

Preferably, the method, in particular steps a) and b), for preparing precious metal nanoparticles is conducted in the presence of air, in particular under atmospheric pressure.

In a preferred embodiment of the present invention step b) is conducted at ambient temperature. Preferably step b) is conducted at a temperature of 10 to 40° C., preferably 10 to 35° C., preferably 10 to 30° C. preferably 15 to 30° C., preferably 15 to 25° C., preferably 20 to 25° C.

In a further preferred embodiment of the present invention step b) is conducted under the application of thermal energy.

In another embodiment of the present invention step b) is conducted under the application of light, preferably ambient light, preferably UV-light.

Preferably, step b) is conducted under the application of thermal energy and light, preferably ambient light, preferably UV-light. Preferably, the application of UV-light allows for localized formation of nanoparticles.

In another embodiment of the present invention, step b) is conducted under reflux temperature of the at least one mono-alcohol. Preferably, the reflux temperature of the at least one mono-alcohol in the at least one mono-alcoholic solvent system is 65° C. to 90° C., preferably 65° C. to 85° C. The reflux temperature is selected depending on the boiling temperature of the at least one mono-alcohol used in the at least one mono-alcohol solvent system.

In a preferred embodiment of the present invention the at least one mono-alcohol in the at least one mono-alcoholic solvent system is recovered, for instance by centrifugation and/or distillation, and re-used in the method for preparing precious metal nanoparticles free of organic adsorbates that have a molar weight above 100 g/mol, in particular in step b), preferably under reflux temperatures. Preferably, the at least one mono-alcohol in the at least one mono-alcoholic solvent system is re-used at least six times.

In a preferred embodiment of the present invention the at least one base is selected from lithium hydroxide (LiOH), sodium hydroxide (NaOH), potassium hydroxide (KOH) or a mixture thereof. In a particularly preferred embodiment the at least one base is lithium hydroxide (LiOH). In a particularly preferred embodiment the at least one base is sodium hydroxide (NaOH). In a further preferred embodiment the at least one base is potassium hydroxide (KOH).

In a preferred embodiment of the present invention the molar ratio of the at least one base to the at least one precursor of the precious metal nanoparticle in the reaction mixture obtained in step b) is preferably $0<n<1750$, preferably $0.5<n<500$, preferably $1<n<250$, preferably $2<n<100$, preferably $5<n<80$, preferably $10<n<60$, preferably $15<n<40$, preferably $15<n<30$, preferably $n=20$.

In a preferred embodiment of the present invention in step c) centrifugation and/or distillation is carried out so as to obtain solid precious metal nanoparticles. In particular, in step c) the precious metal nanoparticles are separated and obtained from the at least one solvent system, comprising the at least one base.

In a preferred embodiment the precious metal nanoparticles obtained in step c) are isolated as a solid, in particular solid powder.

Preferably, the solid precious metal nanoparticles, in particular precious metal nanoparticle powders, are re-dispersible in organic solvents. Preferably, the solid precious metal nanoparticles, in particular precious metal nanoparticle powders, are re-dispersible in ethylene glycol, methanol, ethanol, propanol, acetone, cyclohexanone and mixtures thereof. Preferably, the solid precious metal nanoparticles, in particular precious metal nanoparticle powders, are re-dispersible in aqueous media, e.g. water, aqueous buffers and aqueous saline solutions, each with a pH ranging from 2.5 to 12.5. Preferably, the solid precious metal nanoparticles, preferably precious metal nanoparticle powders, are re-dispersible in organic solvents and aqueous media, e.g. water, aqueous buffers and aqueous saline solutions, each with a pH ranging from 2.5 to 12.5.

In another embodiment of the present invention the precious metal particles obtained in step c) have a particle size of less than 20 nm, preferably less than 15 nm, preferably less than 12 nm, preferably less than 10 nm, more preferably less than 8 nm, preferably less than 6 nm, preferably less than 5 nm, preferably less than 4 nm. Preferably, the precious metal particles obtained in step c) have a particle size of at most 20 nm, preferably at most 15 nm, preferably at most 12 nm, preferably at most 10 nm, more preferably at most 8 nm, preferably at most 6 nm, preferably at most 5 nm, preferably at most 4 nm. Preferably, the precious metal nanoparticle obtained in step c) have a particle size of 0.1 to 20 nm, preferably 0.1 to 15 nm, preferably 0.2 to 12 nm, preferably 0.25 to 10 nm, preferably 0.5 to 8 nm, preferably 0.75 to 6 nm, preferably 0.8 to 5 nm, preferably 1 to 4 nm.

In a preferred embodiment of the present invention the precious metal nanoparticles free of organic adsorbates that have a molar weight above 100 g/mol obtained in step c) are selected from Pt, Pd, Ir, Ru, PtX, PdX, IrX, RuX nanoparticles, wherein X is a metal, more preferably Pt, Pd, Ir, Ru, Rh, Cu, Co, Y, Fe, Zn, Ni, Sn, Bi, Au or Ag, most preferably Pt, Pd, Ir, Ru or Rh.

In a preferred embodiment of the present invention the precious metal nanoparticles obtained in step c) can be used for bio-medical applications.

In a preferred embodiment of the present invention the precious metal nanoparticles obtained in step c) are used for the preparation of support-free heterogeneous catalysts or electrocatalysts, in particular are support-free heterogeneous catalysts or electrocatalysts.

In a further embodiment of the present invention the precious metal nanoparticles obtained in step c) are used for the preparation of supported heterogeneous catalysts or electrocatalysts.

In a preferred embodiment of the present invention the precious metal nanoparticles are used in sensing devices, energy devices, in particular fuel cells, water remediation, bio applications or medical applications.

The precious metal nanoparticles obtainable, in particular obtained, by the method according to the present invention, in particular in step c) can be obtained as a, preferably stable, colloidal dispersion or in solid form. In particular the precious metal nanoparticles obtained in step c) in form of a colloidal dispersion can be subjected to solvent removal to obtain wet or dried solid precious metal nanoparticles, in particular wet or dried solid precious metal nanoparticle powders, depending on the degree of solvent removal.

The present invention, thus, also relates to a colloidal dispersion of precious metal nanoparticles free of organic adsorbates that have a molar weight above 100 g/mol obtainable, in particular prepared, by the method according to the present invention.

The precious metal nanoparticle colloidal dispersion obtainable, in particular prepared, according to the method of the present invention is advantageously stable in organic or aqueous solvents for at least six months. The presently obtained colloidal dispersion of precious nanoparticles obtainable according to the present invention are further characterized by their stability in organic and also in aqueous media, in particular water, aqueous buffers or aqueous saline solution, each with a pH ranging from 2.5 to 12.5, in particular for at least six months.

In the context of the present invention the stability in organic and aqueous media is measured and determined as follows. Stability is evaluated as the permanence of a coloured suspension (brown to black) and the absence of a large amount of sedimented or precipitated nanoparticles. For such samples maintenance of particle size is probed by transmission electron microscopy (TEM).

The present invention thus also relates to solid precious metal nanoparticles free of adsorbates that have a molar weight above 100 g/mol obtainable, in particular prepared, by the method according to the present invention.

In a preferred embodiment of the present invention the solid precious metal nanoparticles are obtained from the colloidal dispersion of the present invention obtained in step c) by centrifugation and/or distillation. Preferably, the solid precious metal nanoparticles are obtained by centrifugation. Preferably, the solid precious metal nanoparticles are obtained by distillation.

In a preferred embodiment of the present invention the solid precious metal nanoparticles are obtained as wet solid precious metal nanoparticles, in particular as wet solid precious metal nanoparticle powders. Preferably, the wet solid precious metal nanoparticles, in particular wet solid precious metal nanoparticle powders, are obtained directly from the sedimentation of the colloidal dispersion. Preferably, the wet solid precious metal nanoparticles, in particular wet solid precious metal nanoparticle powders, are obtained by solvent removal, preferably using centrifugation and/or distillation and/or drying at reduced pressure. Preferably, the wet solid precious metal nanoparticles, in particular wet solid precious metal nanoparticle powders, have a paste-like consistency.

In a further preferred embodiment of the present invention the solid precious metal nanoparticles of the present invention are dried. Preferably, the solid precious metal nanoparticles are obtained as dried solid precious metal nanoparticles, in particular as dried solid precious metal nanoparticle powders. Preferably, the dried solid precious metal nanoparticles, in particular dried solid precious metal nanoparticle powders, are obtained from the wet solid precious metal nanoparticles by complete solvent removal.

In a preferred embodiment of the present invention the complete solvent removal to obtain dried solid precious metal nanoparticles, in particular dried solid metal nanoparticle powders, involves drying the nanoparticles for a prolonged time. Preferably, the complete solvent removal to obtain dried solid precious metal nanoparticles, in particular dried solid precious metal nanoparticle powders, involves drying the nanoparticles in a flow of gas, preferably $N_2$. Preferably, the complete solvent removal to obtain dried solid precious metal nanoparticles, in particular dried precious metal nanoparticle powders, involves drying the nanoparticles for a prolonged time in a flow of gas, preferably $N_2$.

Advantageously the use of low boiling point monoalcohols, in particular methanol, ethanol or propanol, preferably ethanol or methanol, preferably methanol, in the at least one mono-alcoholic solvent system allows for complete solvent removal from the obtained precious metal nanoparticles. Thus, dried solid precious metal nanoparticles, in particular dried solid precious metal nanoparticle powders, can be prepared which can be filled into vessels and thereafter be re-dispersed as required without any significant change in particle size and preferably without any significant loss in catalytic activity.

Thus, the present invention also relates to wet and dry solid precious metal nanoparticles free of adsorbates that have a molar weight above 100 g/mol obtainable, in particular prepared, by the method according to the present invention.

The dried precious metal nanoparticles, in particular dried precious metal nanoparticle powders, can be re-dispersed in organic solvents, such as methanol, ethanol or propanol, or aqueous media, e.g. aqueous solutions, with a pH in the range of 2.5 to 12.5, wherein particle size and preferably catalytic activity of the re-dispersed precious metal nanoparticles are maintained.

The solid precious metal nanoparticles obtainable according to the present invention are in particular characterized by the ability to be re-dispersible in organic solvents and furthermore they are also re-dispersible in aqueous media, e.g. water, buffer or aqueous saline solutions, each with a pH ranging from 2.5 to 12.5.

In the context of the present invention, the re-dispersibility in organic solvent and aqueous media is measured and determined as follows. Re-dispersibility is evaluated as the appearance of a stable colloidal dispersion (brown or black) in the absence of large amounts of sedimented or precipitated nanoparticles upon addition of a solvent to dried or wet solid precious metal nanoparticles. For re-dispersed samples maintenance of particle size is probed by transmission electron microscopy (TEM).

Furthermore, the solid nanoparticles obtainable according to the present invention are characterized by the stability of the re-dispersed solid nanoparticles, in particular by being stable for at least six months in aqueous media, e.g. in deionized water.

The present invention relates to re-dispersed precious metal nanoparticles free of organic adsorbates that have a molar weight above 100 g/mol obtainable, preferably obtained by the method according to the present invention.

In a preferred embodiment of the present invention the re-dispersed precious metal nanoparticles free of organic adsorbates that have a molar weight above 100 g/mol are re-dispersed in organic solvents. Preferably, the precious metal nanoparticles free of organic adsorbates that have a molar weight above 100 g/mol are re-dispersed in ethylene glycol, methanol, ethanol, propanol, acetone, cyclohexanone or mixtures thereof. Preferably, the precious metal nanoparticles free of organic adsorbates that have a molar weight above 100 g/mol are re-dispersed in aqueous media, buffers or aqueous saline solutions with a pH ranging from 2.5 to 12.5. Preferably, the precious metal nanoparticles free of organic adsorbates that have a molar weight above 100 g/mol are re-dispersed in organic solvents, in particular methanol, in aqueous media, e.g. water, preferably deionized water, aqueous buffers or aqueous saline solutions, each with a pH ranging from 2.5 to 12.5, or in a combination thereof.

The present re-dispersed precious metal nanoparticles are in particular characterized by their above-identified stability in aqueous media, in particular deionized water, for at least six months.

The present invention also relates to products comprising precious metal nanoparticles, obtainable, in particular prepared, by the method according to the present invention.

In a preferred embodiment of the present invention the product comprising precious metal nanoparticles, obtainable, in particular prepared, by the method according to the present invention is selected from catalysts, sensing devices, energy devices, supported catalysts, membranes, supports, electric and magnetic devices and means for bio and medical applications, e.g. therapy, sensing, imaging.

In a preferred embodiment of the present invention the product comprising precious metal nanoparticles comprises a colloidal dispersion of precious nanoparticles free of organic adsorbates that have a molar weight above 100 g/mol.

In a preferred embodiment of the present invention the product comprising precious metal nanoparticles comprises solid precious nanoparticles free of organic adsorbates that have a molar weight above 100 g/mol.

In a preferred embodiment of the present invention the product comprising precious metal nanoparticles comprises wet solid precious nanoparticles free of organic adsorbates that have a molar weight above 100 g/mol.

In a preferred embodiment of the present invention the product comprising precious metal nanoparticles comprises dried solid precious nanoparticles free of organic adsorbates that have a molar weight above 100 g/mol.

In a preferred embodiment of the present invention the product comprising precious metal nanoparticles comprises re-dispersed precious metal nanoparticles free of organic adsorbates that have a molar weight above 100 g/mol.

In a preferred embodiment of the present invention the product comprising precious metal nanoparticles is obtained by applying the colloidal precious metal nanoparticle dispersion onto a suitable substantive, e.g. support, and by subsequently removing the solvent, preferably by solvent evaporation.

In a preferred embodiment of the present invention the product comprising precious metal nanoparticles is a product obtained according to the present method for preparing precious nanoparticles, wherein in step a) at least one support is provided and step b) is conducted in the presence of the at least one support, so as to obtain in step c) supported precious metal nanoparticles free of organic adsorbates that have a molar weight above 100 g/mol. Thus, said product comprises precious metal nanoparticles on the support, wherein said product is characterised by the specific nature of the presently provided precious metal nanoparticles. In particular, upon removal of the precious metal nanoparticles from the support said precious metal nanoparticles show the same re-dispersity and stability characteristics as the precious metal nanoparticles prepared without being deposited on a support.

The precious metal nanoparticles obtained by the above identified process of the present invention and being present on the support are such as the precious metal nanoparticles prepared in absence of a support in the reaction mixture in step b), characterised by the ability to be re-dispersed in organic solvents and in aqueous media, in particular water, aqueous buffers or aqueous saline solution, each with a pH ranging from 2.5 to 12.5. Thus, the precious metal nanoparticles present on the support and after removal thereof, show the same properties as the precious metal nanoparticles obtained in the absence of a support in step a) and b) of the present method.

Thus, the present invention also provides precious metal nanoparticles prepared according to a method of a present invention, wherein in step a) at least one support is provided and step b) is conducted in the presence of the at least one support, so as to obtain in step c) supported precious metal nanoparticles free of organic adsorbates that have a molar weight above 100 g/ml and wherein the precious metal nanoparticles are removed from the support.

Thus, in a preferred embodiment the present invention relates to a product, in particular, a supported catalyst, comprising the nanoparticles prepared according to the present method on a support, in particular, on a catalyst support and wherein the precious metal nanoparticles deposited on said support exhibit the same characteristics as the precious metal nanoparticles prepared by the present method and being not deposited on a support.

In the context of the present invention, the term "free of organic adsorbates that have a molar weight above 100 g/mol" means that no substances, which have a molar weight that exceeds 100 g/mol, in particular no polymers, ligands, capping agents and surfactants, are adsorbed on the surface of the precious metal nanoparticles according to the present invention.

In the context of the present invention, the term "mono-alcoholic solvent system" relates to a solvent system comprising, preferably consisting of at least one mono-alcohol or a mixture of at least one mono-alcohol and water.

In the context of the present invention, the term "water" in a preferred embodiment means deionized water.

In the context of the present invention, the term "sedimented" referring to nanoparticles in a preferred embodiment means that the nanoparticles are not fully stable as colloidal dispersions and partially or totally accumulate at the bottom of the container but can be re-dispersed in at least one solvent, confirming that they are not sintered.

In the context of the present invention, the term "precipitated" means that the nanoparticles are not fully stable as colloidal dispersions and totally accumulate at the bottom of the container and cannot be re-dispersed with improved stability in the regard of precipitation in at least one solvent. In contrast to "sedimented" the "precipitated" nanoparticles are sintered.

In the context of the present invention, the term "precious metal nanoparticle" relates to nanoparticles comprising at least one precious metal. Thus, the term encompasses for example nanoparticles comprising solely one precious metal, nanoparticles comprising at least two precious metals as well as nanoparticles comprising at least one precious metal and at least one non-precious metal.

In the context of the present invention, the term "one-step process" relates to the full reduction of the at least one inorganic precursor for the precious metal nanoparticle in the reaction mixture obtained in step b) of the method according to the present invention by mixing together all components provided in step a) at the same time. Thus, the term in particular excludes processes in which further sub-steps, e.g. the sequential addition or removal of components or adjustment of the reaction parameters, are performed. Accordingly, the term excludes such processes in which not all components provided in step a) are mixed together at the same in step b).

Specifically, the sequential addition of one component selected from the group comprising the at least one inorganic precursor for the precious metal nanoparticle, the at least one mono-alcoholic solvent system and the at least one base to a reaction mixture comprising the other two components is not considered a "one-step process" in the context of the present invention.

In the context of the present invention, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

The embodiments, especially the preferred embodiments, relating to the method of the present invention apply also mutatis mutandis to the colloidal dispersion of precious metal nanoparticles, the solid precious metal nanoparticles, the re-dispersed precious metal particles and the products comprising precious metal nanoparticles according to the present invention.

Further preferred embodiments of the present invention are subject of the subclaims.

The invention is further described by way of the following examples and the accompanying figures.

FIG. 1 shows the size distribution of Pt nanoparticles determined by TEM image analysis for different experimental parameters. The metal concentrations, solvent (MeOH) and base/metal (20) ratio were the same in all cases. MW stands for microwave-induced synthesis. UV stands for UV-light-induced synthesis.

Figure 4:
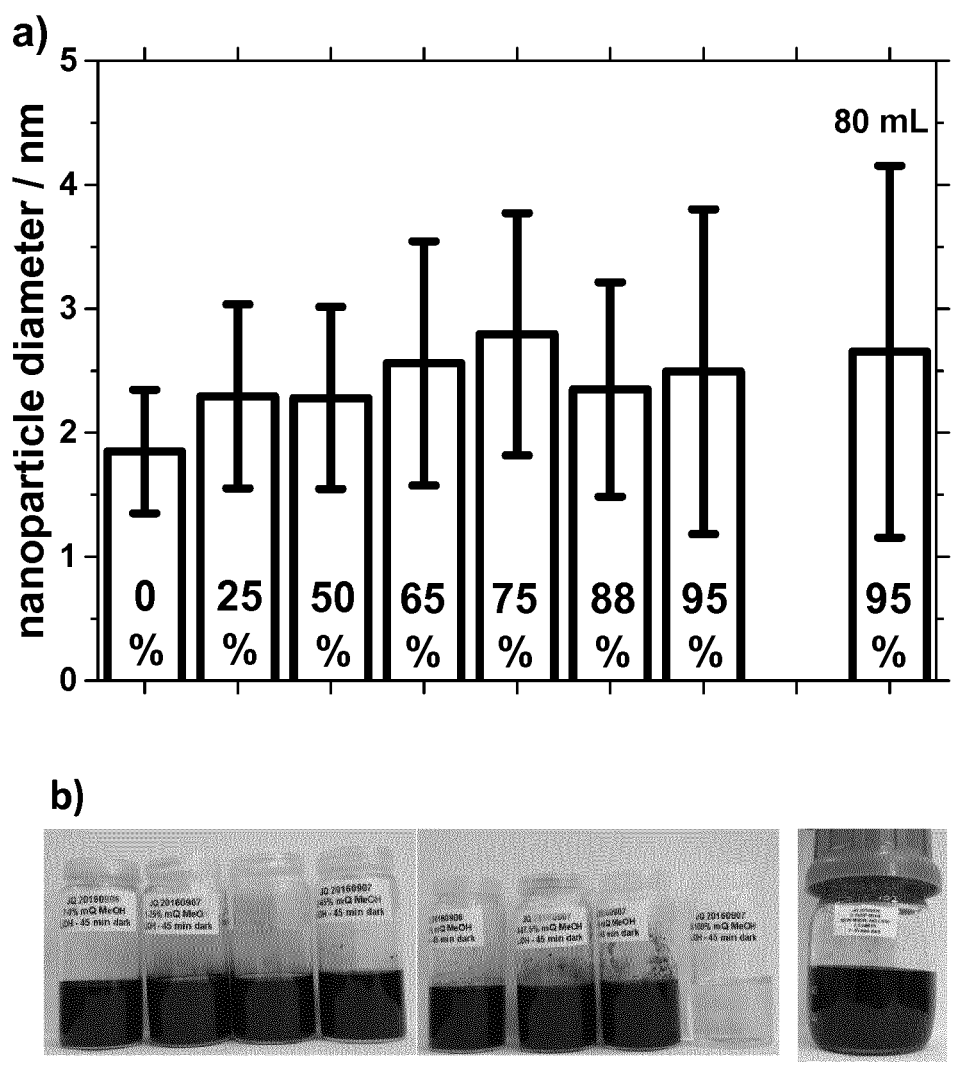

FIG. 4 shows (a) the size distribution estimated by TEM image analysis for the synthesis of Pt NPs obtained with different water content in methanol from 0 to 95% as indicated on each data point. In all cases the LiOH/Pt ratio is 20, the concentration of $H_2PtCl_6$ used was 2.5 mM and the volume of reaction is 8 mL except for the last data point for which the total volume was 80 mL. (b) Pictures of the same colloidal suspensions with water content in methanol from left to right: 0, 25, 50, 65, 75, 88, 95, 100 and 95%. The solutions are stable at least 2 months.

Figure 5:
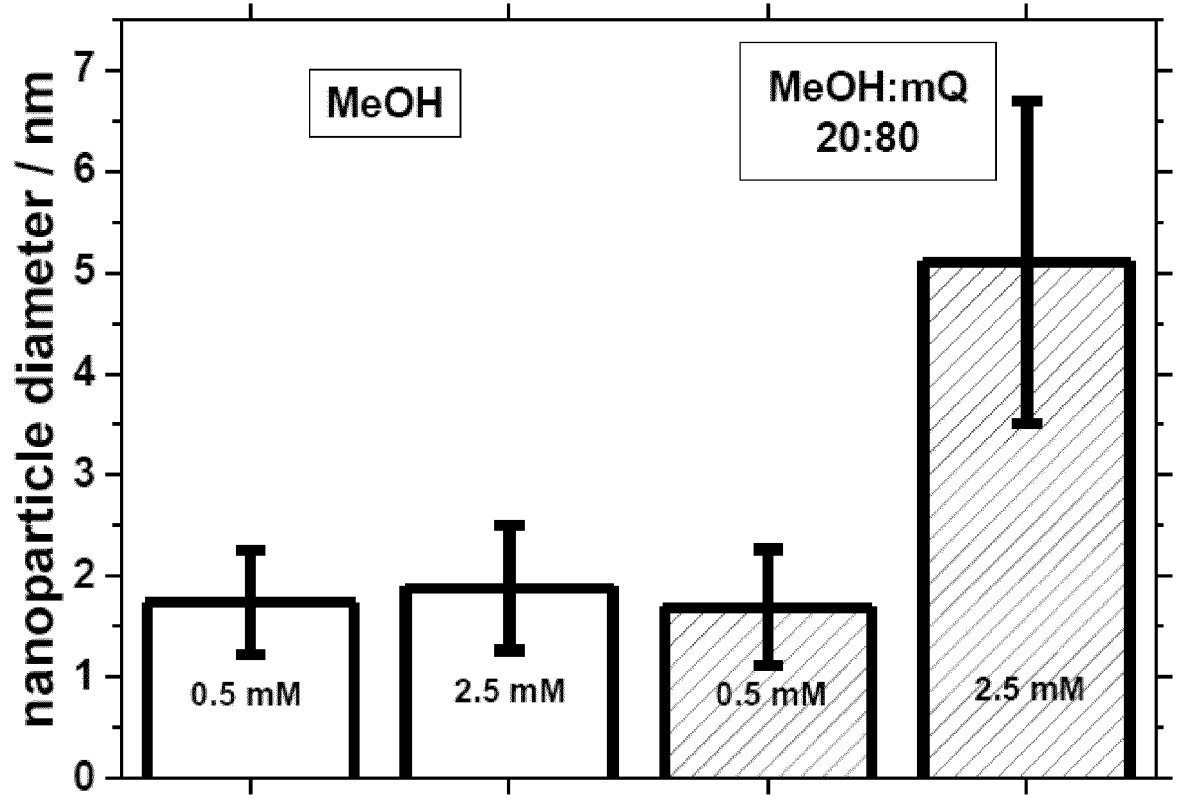

FIG. 5 shows the size distribution estimated by TEM image analysis for the synthesis of Pt nanoparticles obtained with different MeOH:$H_2O$ ratios: pure MeOH or MeOH:mQ (20:80). In all cases the base/metal ratio is 20. The concentration of Pt precursor is 0.5 mM or 2.5 mM as indicated.

Figure 6:
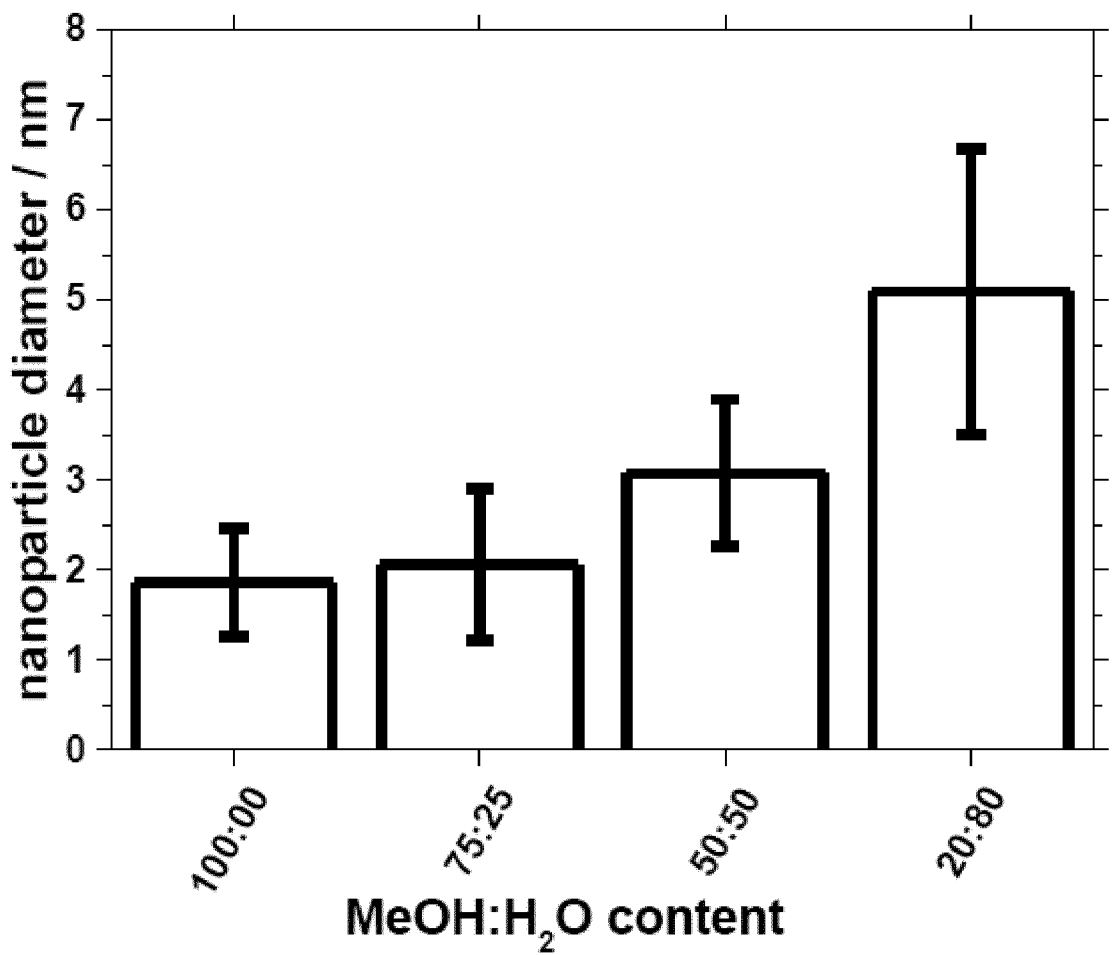

FIG. 6 shows the size distribution estimated by TEM image analysis for the synthesis of Pt nanoparticles obtained with different MeOH:$H_2O$ ratios. In all cases the base/metal ratio is 20. The concentration of Pt precursor is 2.5 mM.

Figure 7:
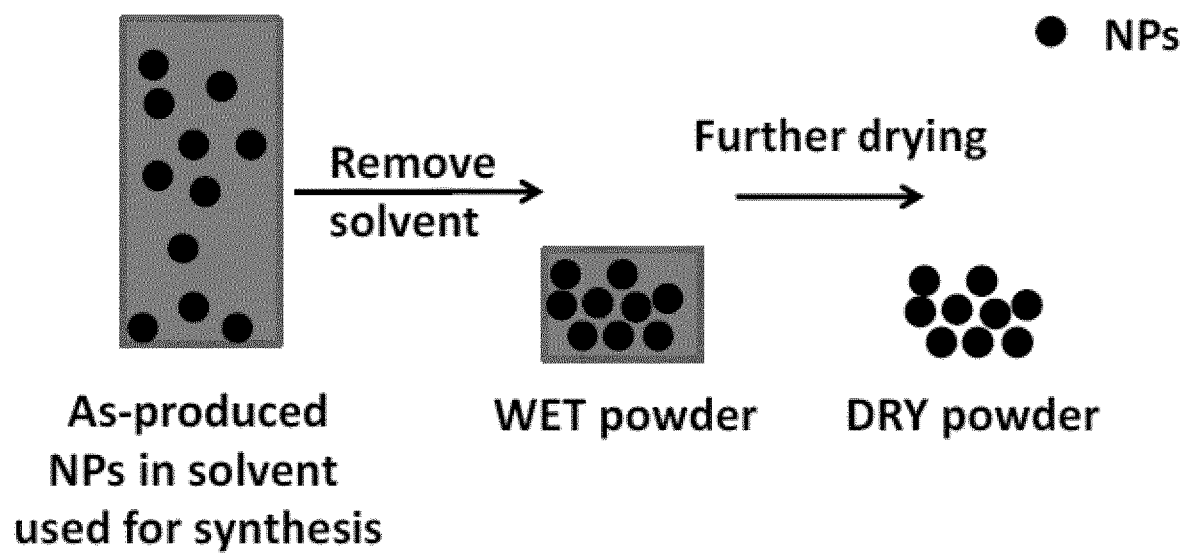

FIG. 7 shows the workflow to obtain all of the produced nanoparticles.

Figure 8:
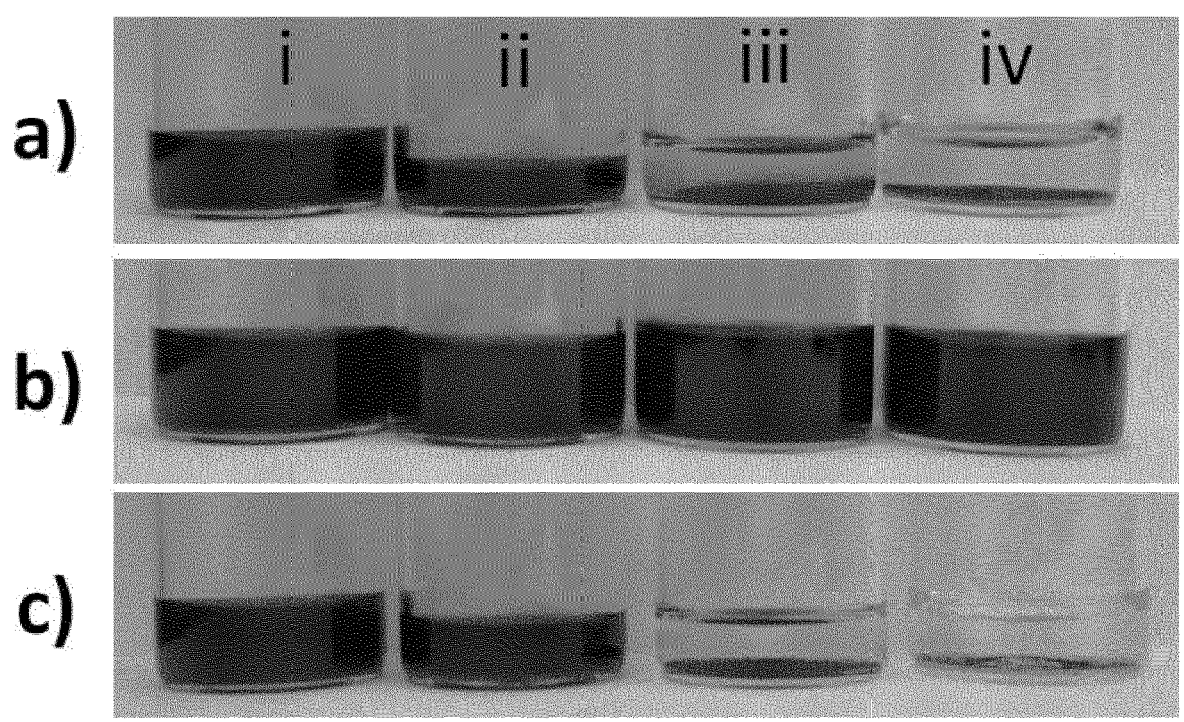

FIG. 8 shows Pt nanoparticles obtained by the method in the prior art using ethylene glycol as solvent and washing the obtained nanoparticles in concentrated HCl before re-dispersion (a), Pt nanoparticles obtained by the method according to the present invention, which does not require an additional washing step (b) and Pt nanoparticles obtained by the method according to the present invention, wherein an (unnecessary) washing step with concentrated HCl has been performed for comparison (c). Solvents used for re-dispersion are i: ethylene glycol (EG), ii: cyclohexanone, iii: methanol (MeOH) and iv: water.

Figure 9:
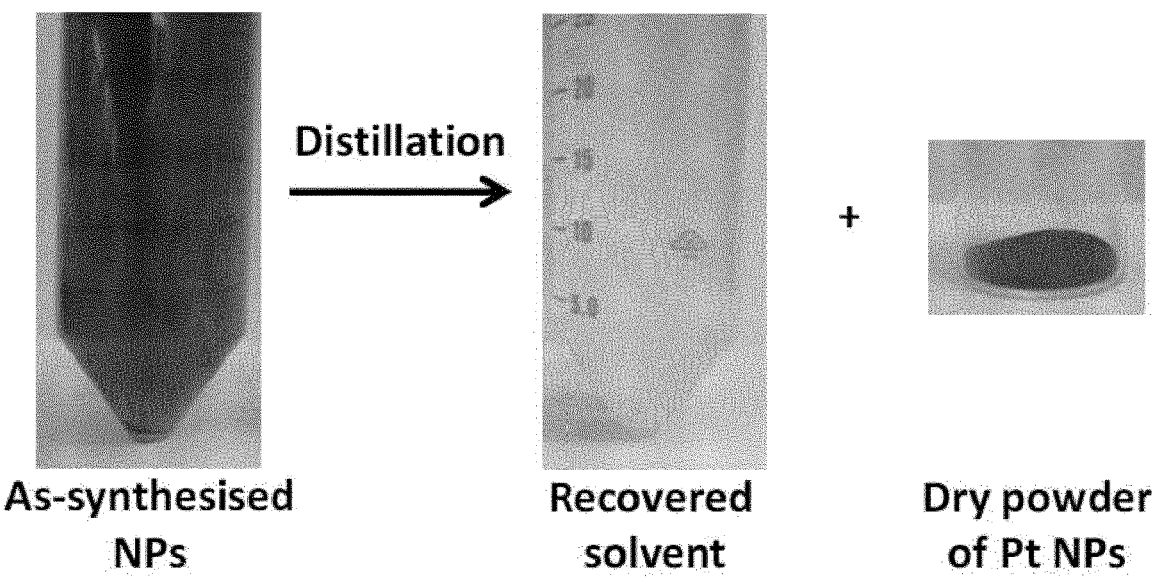

FIG. 9 shows a schematic representation of the distillation process enabling to recover the solvent for reaction and to obtain a dry powder of precious metal nanoparticles.

Figure 10:
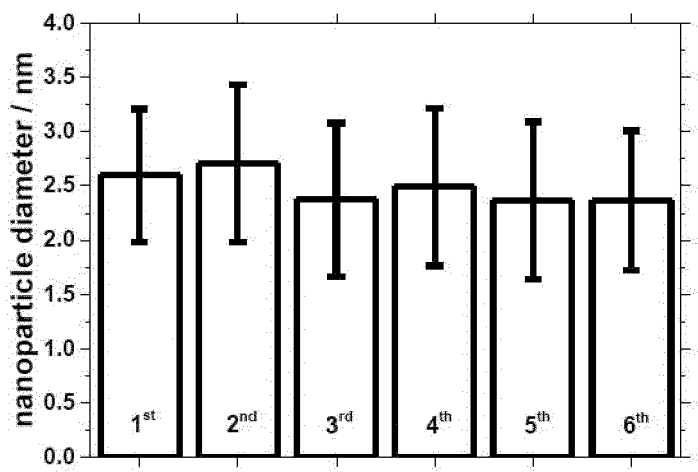
Figure 10:
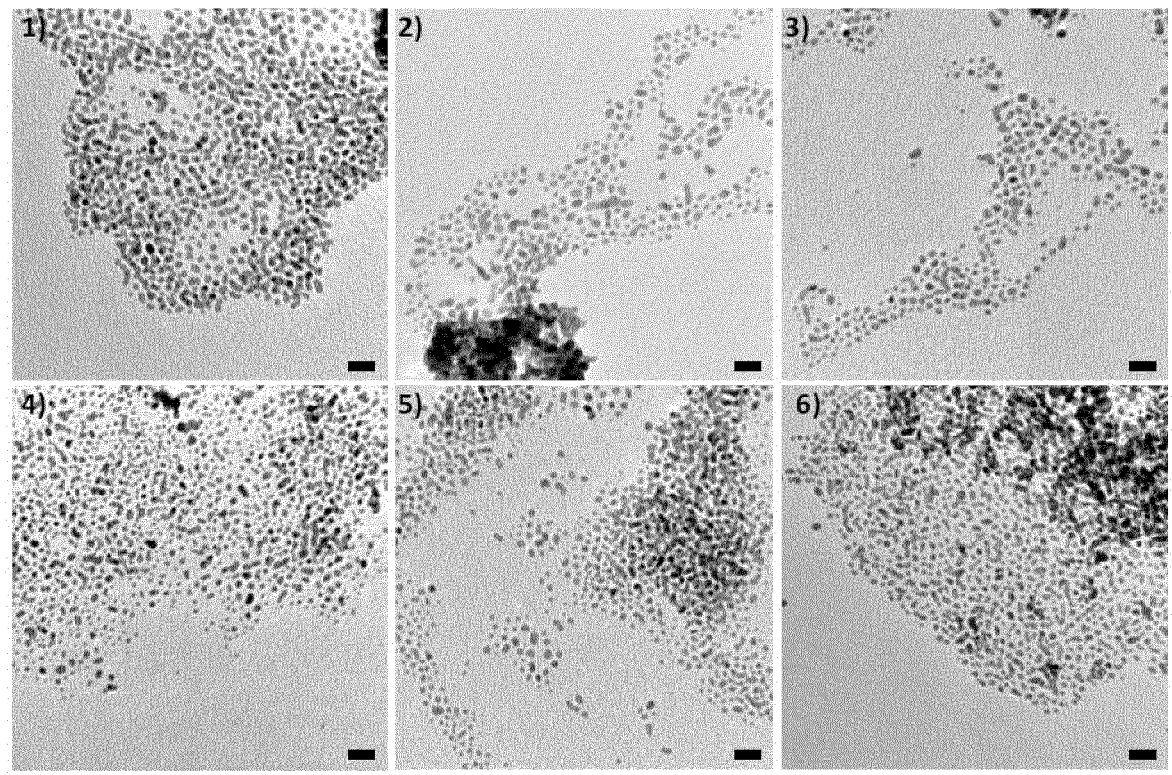

FIG. 10 shows the size distribution of the Pt nanoparticles obtained after successive syntheses in which the solvent was recovered after each synthesis. The size was estimated from the analysis of TEM images. The scale bars are 10 nm.

Figure 11:
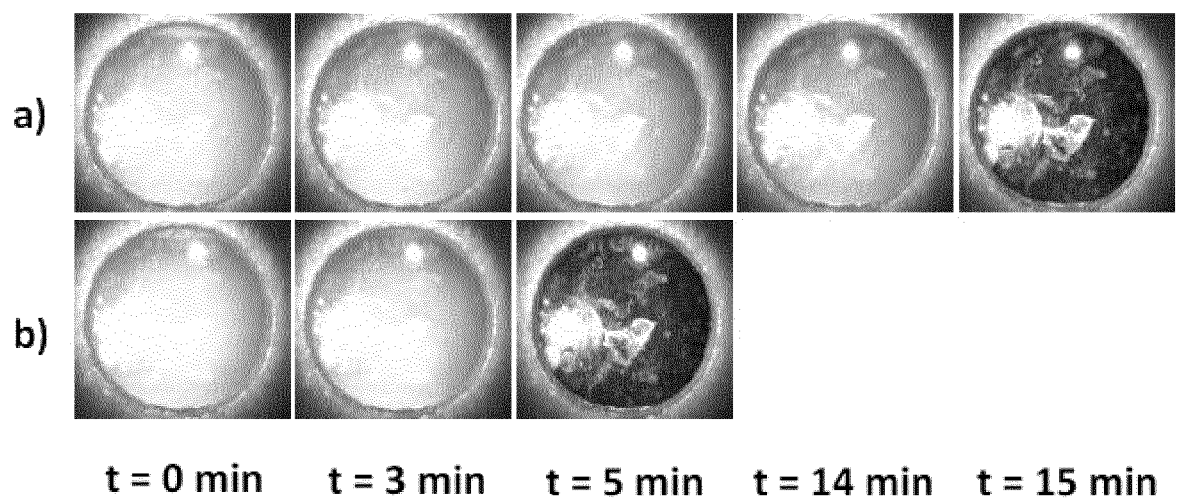

FIG. 11 shows control of the reaction time by pre-treatment of the precursor used for the synthesis. The only difference between the top row and the bottom row is that in the bottom row the precursor used in methanol was irradiated with UV-light for 30 min prior to mixing with NaOH. The ration of NaOH/Pt was 20.

Figure 12:
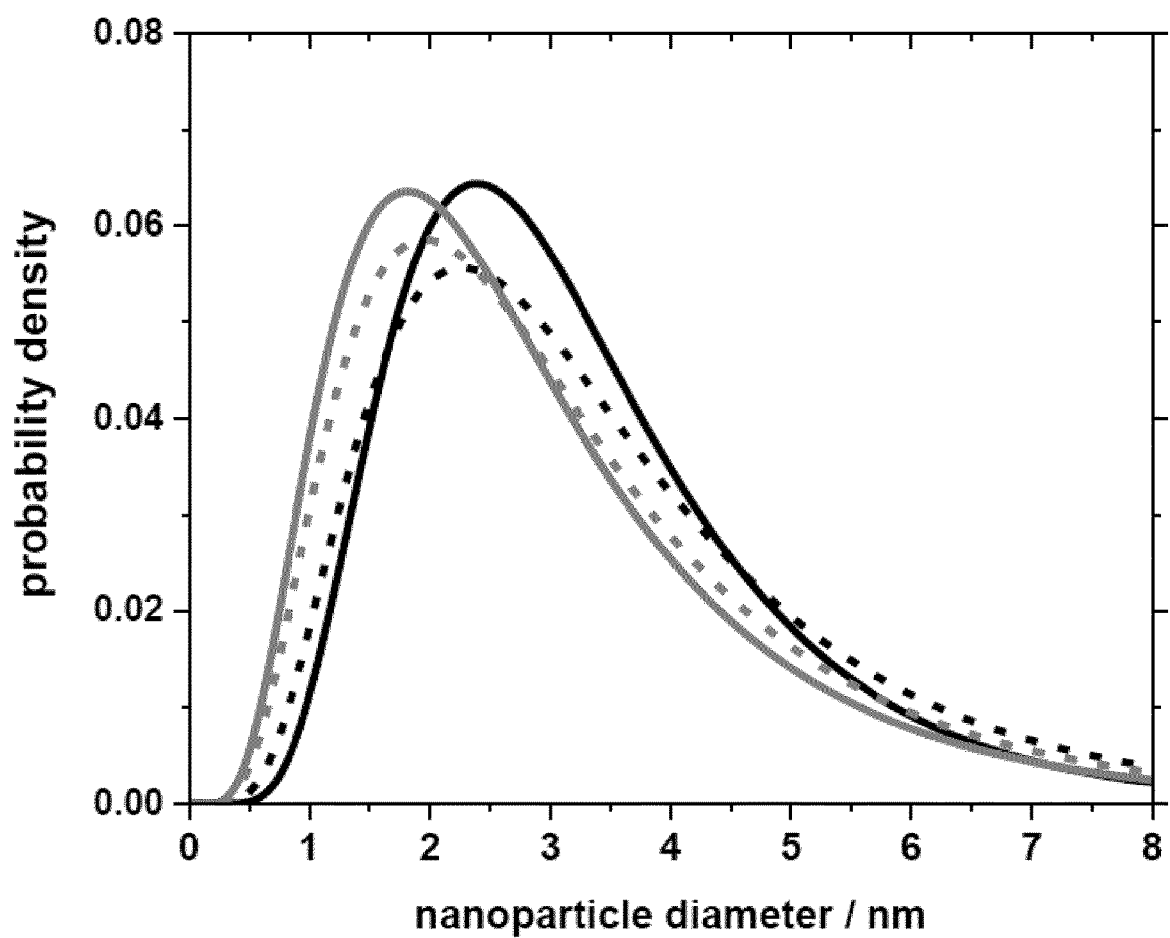

FIG. 12 shows the size distribution of nanoparticles obtained under identical experimental conditions using a freshly made precursor salt solution in MeOH (black solid line) and EtOH (gray solid line) and the same precursor salt solution after 30 min UV-light irradiation in MeOH (black dashed line) and EtOH (gray dashed line) estimated by SAXS measurements.

Figure 13:
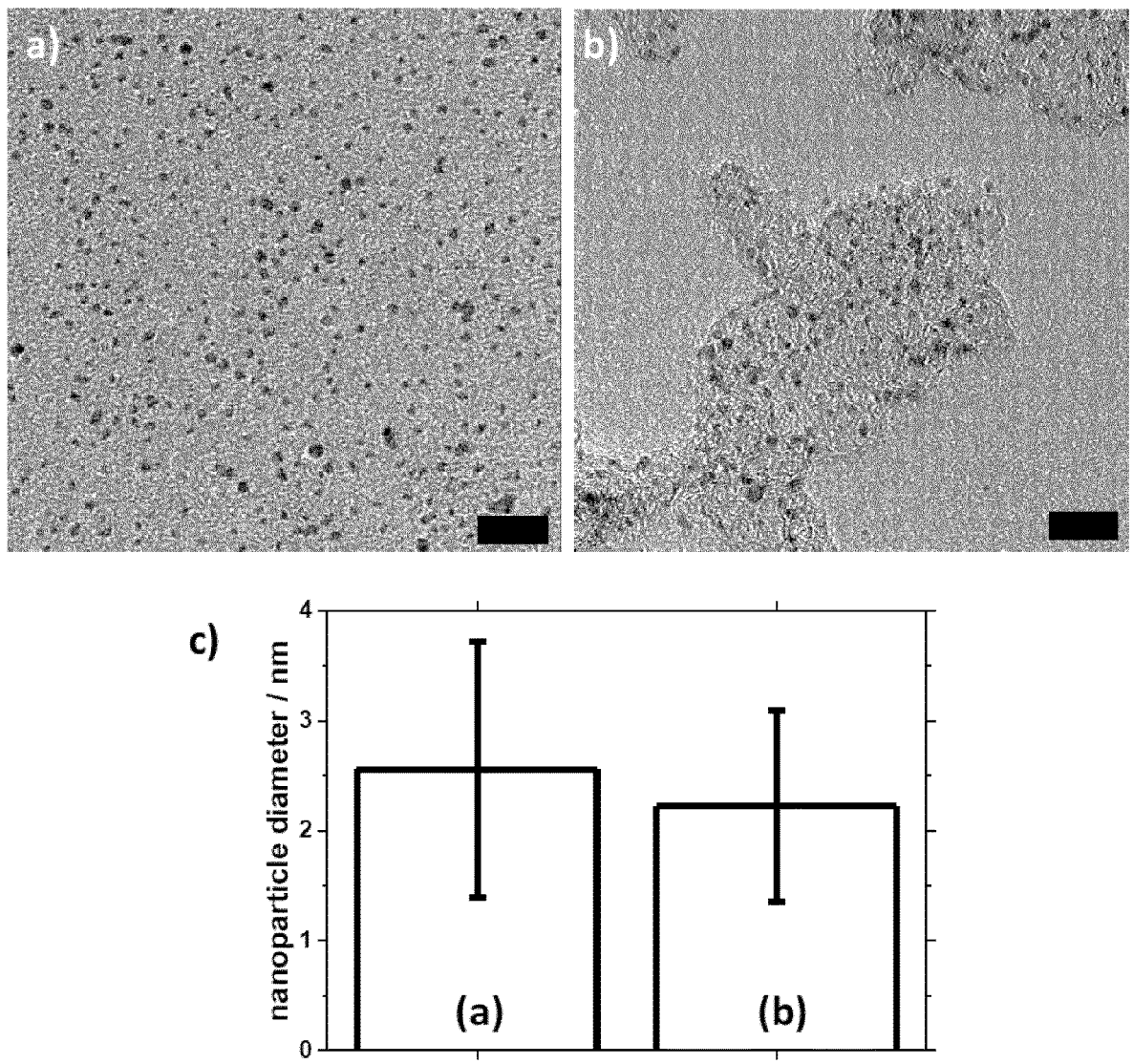

FIG. 13 shows TEM images of (a) support free Pt NPs as prepared using alkaline ethanol as solvent and (b) supported Pt NPs using a one-pot synthesis for direct immobilisation on a carbon support. The scale bar is 10 nm on both images. (c) Comparison of the size distribution for samples corresponding to the synthesis approach related to image (a) and (b). Within the accuracy of the measurement, the particle sizes are identical.

Figure 14:
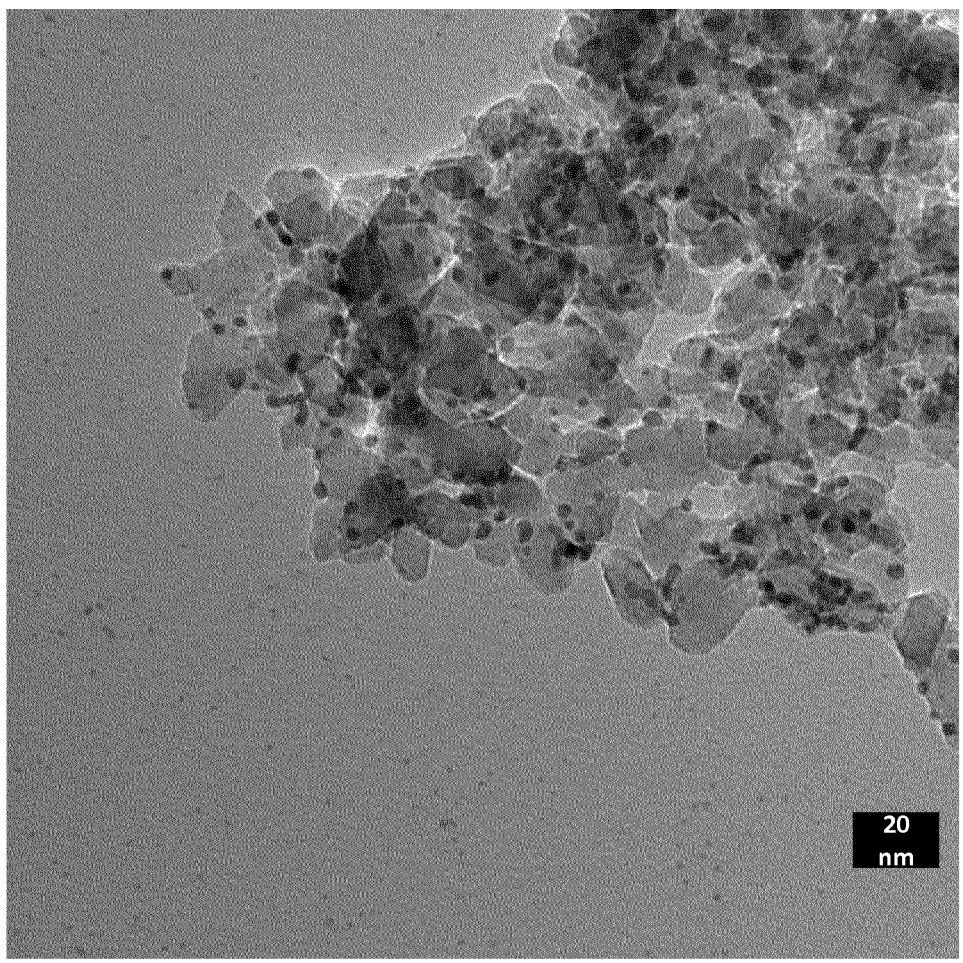

FIG. 14 shows a TEM image of NPs immobilized on an alumina support with an estimated size distribution of 2.75±0.69 nm.

Figure 15:
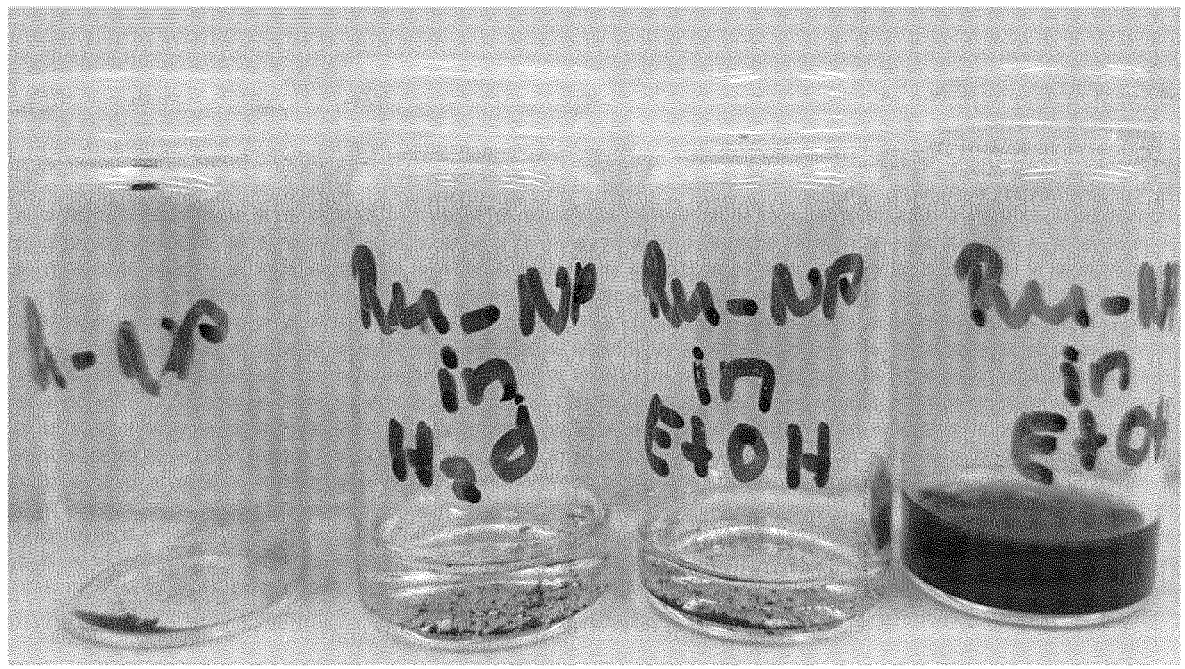

FIG. 15 shows a comparison of Ru NPs prepared according to a method described in the prior art with Ru NPs prepared according to the method of the present invention. The Ru NPs obtained by the method described in the prior art precipitate completely (a) and cannot be dispersed in water (b) or ethanol (c), wherein the NPs prepared according to the method of the present invention are obtained as a stable colloidal dispersion (d).

EXAMPLES

Example 1

Platinum (Pt) Nanoparticles
1. Synthesis and Size Control

For the synthesis of nanoparticles (NPs), hexachloroplatinic acid hexahydrate ($H_2PtCl_6.6H_2O$) and NaOH (alternatively KOH or LiOH) are mixed together in methanol (MeOH) or ethanol (EtOH) so as to provide a reaction mixture. Basically, every metal precursor and base can be used that is soluble in the mono-alcoholic solvent system. Typically, the concentration of the platinum precursor in the reaction mixture varies between 0.5 mM to 2.5 mM, the final ratio of NaOH/Pt is typically 20 (so a final concentration of NaOH in the reaction mixture is 10 mM to 50 mM) but particle formation still works for ratios in the range 0<n<1750 (n=Base/Pt ratio) and may be further expanded but without forming perfect colloidal dispersions. The best compromise found for the experimental conditions in an approach to minimise the amount of NaOH and yet obtain stable colloidal dispersions (with LiOH or NaOH) is a ratio of NaOH (LiOH) to Pt of 10-20. The final volume is typically between 8 to 80 mL, but not limited to further scalability. In the following a specific example is given for a mixture of platinum precursor at 2.5 mM, NaOH/Pt ratio of 20 and the solvent being MeOH.

1.1 Ambient Reaction Temperature

Under stirring but by leaving the reaction mixture at ambient conditions (e.g. volume 8 mL) the reaction mixture turns from yellow to brown within 30 hours indicating the formation of colloidal nanoparticles. Transmission electron micrographs (TEM), EDS data confirm the mixture is made of platinum nanoparticles of approx. 2 nm.

1.2 Light-Induced Reaction

The same reaction mixture can be converted to Pt NPs by using light irradiation. In the present example UV light was used. It then takes about 30 min to obtain NPs. The size obtained is also approx. 2 nm as observed for the reaction at ambient temperature without additional light irradiation.

1.3 Thermally Induced Reaction

The same reaction mixture can be converted to Pt NPs by using a thermal treatment. The reaction mixture is placed in a flask equipped with a reflux condenser. The temperature can be raised up to the boiling point of the solvent (approx. 65° C. for MeOH, approx. 78° C. for EtOH) and the yellow solution turns brown in about 20 min. The size obtained using a bath or a microwave for heating up the solution is also approx. 2 nm.

The conversion to NPs can also be achieved by placing a container with the reaction mixture (e.g. 5 mL with EtOH as solvent) in a hot water bath (e.g. 75° C.). In the case of using EtOH as solvent it takes 10 min to see a colour change for a 0.5 mM solution of Pt (NaOH/Pt=20).

Figure 1:
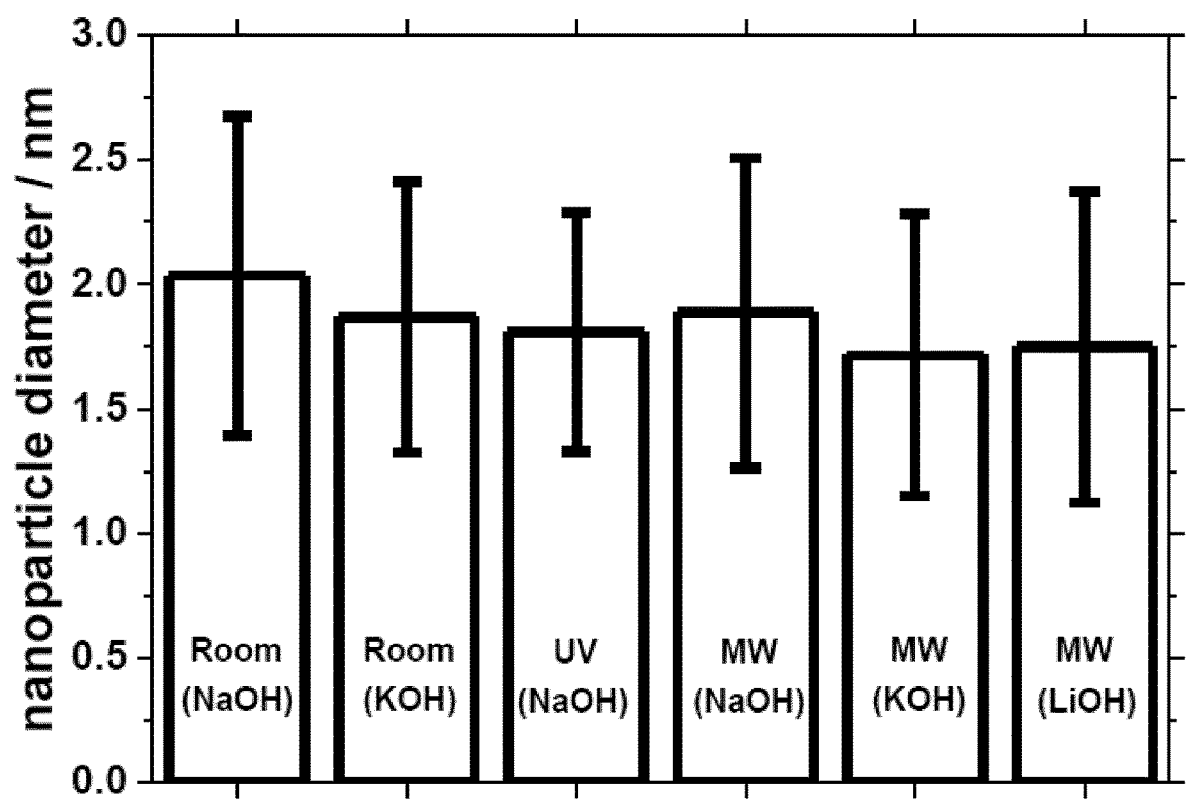

Regardless of the synthesis method used (light irradiation, ambient conditions, thermal treatment) and the applied base (NaOH, KOH or LiOH), the size of the as-produced NPs is not significantly changed as apparent from FIG. 1 when using identical metal concentrations, same solvent (MeOH) and same base/metal ratio. In the absence of the base the NPs agglomerate rapidly to form a non-dispersible bulk material together with smaller nanomaterials.

1.4 Influence of Solvent

Figure 2:
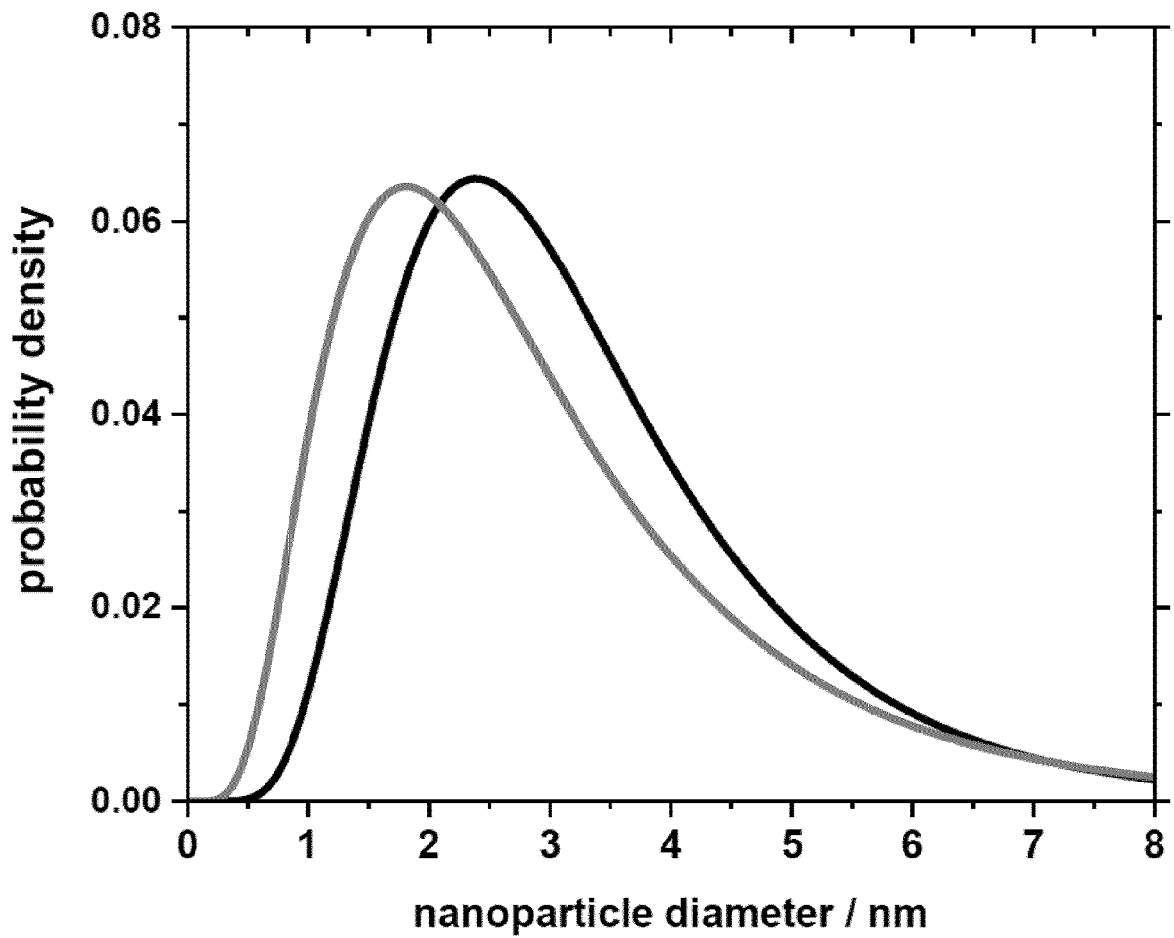
FIG. 2 shows the size distribution of the nanoparticles obtained under identical experimental conditions in MeOH (black) and EtOH (gray) determined by SAXS measurements.

The use of different solvents under similar conditions can enable for controlling particles size. For example, smaller particle sizes are obtained in EtOH compared to the particles prepared in MeOH (FIG. 2).

1.5 Influence of Metal/Base Ratio

Figure 3:
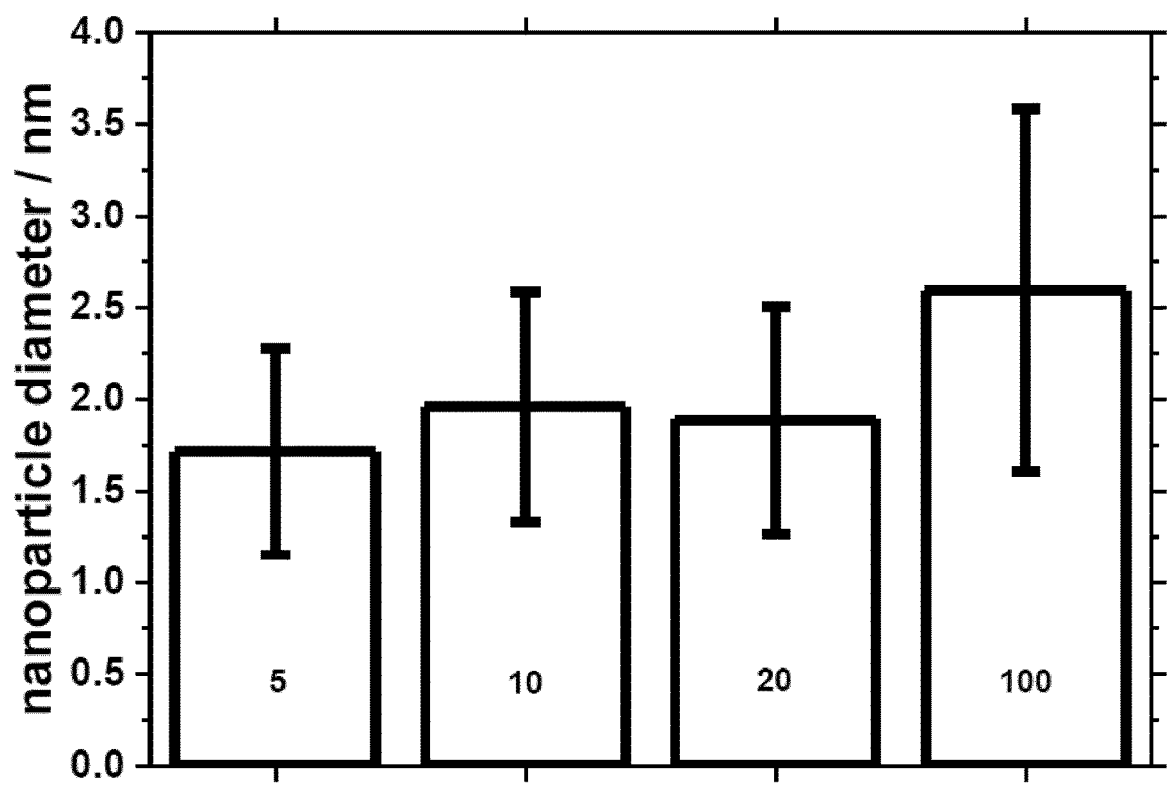
FIG. 3 shows the size distribution estimated by TEM image analysis for the synthesis of Pt nanoparticles in methanol using different NaOH/Pt ratios (5, 10, 20 and 100).

The ratio of metal/base used for synthesis was found to influence the size and stability of the resulting colloidal dispersions. Since NaOH is a more relevant chemical for large scale production of chemicals NaOH was exemplarily used as a base in the following examples. FIG. 3 gathers results obtained showing that the higher the NaOH/Pt ratio the larger the NPs.

1.6 Influence of the Ratio Water/Mono-Alcohol

At low concentration of Pt salt (e.g. 0.5 mM) there is almost no influence on the size of the NPs whether the synthesis is performed in pure methanol/ethanol or a mixture of methanol/ethanol and water (up to 80% water and 20% mono-alcohol) (see FIG. 4). At higher concentration (e.g. 2.5 mM) of Pt salt the size is the same in pure mono-alcohol as for the case of lower concentration (e.g. 0.5 mM) but upon adding water to the reaction mixture the size of the NPs can be increased (FIG. 5). As the water:mono-alcohol ratio increases the size of the NPs increases (FIG. 6).

2. Stability of the Colloidal Dispersions

2.1 Influence of Counter-Ion

The as-produced colloidal dispersions have a different degree of stability depending on the base used. For the same experimental parameters (same Pt concentration, same base/Pt ratio) the stability of the as-produced NPs depends on the cation and decreases in the order Li>Na>K in pure MeOH. This effect is more pronounced in pure mono-alcohol than in mixtures with water. Thus, LiOH is the most suitable base to obtain stable Pt NP dispersion. However, as NaOH is more widely used in industry a more specific focus is given to this base in the following.

2.2 Influence of Metal/Base Ratio

The ratio base/metal not only controls the size of the NPs (FIG. 3) but also the stability of colloidal NP dispersions. FIG. 3 shows that there is not much difference in size for the NPs obtained with NaOH/Pt=5, 10 or 20. However, it is observed that one day after preparation the stability of the colloidal dispersions obtained using different base/metal ratios are considerably different. For high (metal/base ration=100) or low (metal/base ratio=5) NaOH/Pt ratios the stability of the as-produced colloidal dispersion is impaired.

2.3 Influence of Water Content

For mixtures with no or small amount of water (e.g. 20% water in 80% methanol) some particles naturally sediment after 24 hours. For mixtures up to 95% water and 5% methanol the NPs obtained give more stable colloidal dispersions. At 100% water no NPs can be observed (see also FIG. 4).

In mixtures with water the stability increases as the water content increases for all bases (LiOH, NaOH or KOH). With increasing Pt concentration there is a tendency to see more sedimentation. This effect is more pronounced in pure mono-alcohols than in mixtures with water.

3. Wet Powders

There are different ways to use the produced NPs. A first option is to use the NPs directly in the solvent used for synthesis. A second option is to collect NPs that naturally sediment by centrifugation. But typically some NPs will stay in the supernatant and not all the NPs produced will be used. A third option is to precipitate the NPs which can be achieved by adding a base to the as-prepared colloidal dispersion or use the typical approach for polyol-method: to add an aqueous solution of HCl 1 M. A fourth alternative is to remove the low boiling point solvent for instance by distillation to obtain a powder of NPs. Distinction is made between wet powder and dry powder, where extra effort is required to completely remove all solvent from the powder as illustrated in FIG. 7. This distinction is made because the wet and dry powder show slightly different behaviour.

3.1 Re-Dispersibility of Nanoparticles Obtained as Solid (Wet) Powders

Wet powders of the NPs, where no extra effort has been made to completely remove all the solvent, are simply obtained by removing the solvent used for synthesis. This can be done for example by distillation. Alternatively, this can be achieved by tuning different parameters in the NP synthesis to obtain stable or unstable colloidal dispersion, e.g. use of NaOH as base, in order to collect NPs by simple centrifugation after their sedimentation.

The NPs from the 'wet' powders are easily re-dispersible in solvents like ethylene glycol (EG), cyclohexanone, EtOH, but also acetone, MeOH, and water-based solvents and buffers. For instance re-dispersion is possible in aqueous solvent in the range of pH 2.5-12.5, in 10 mM sodium phosphate buffer solution at pH 7 or solution containing NaCl (e.g. 25 mM) with stability for several months. These properties cannot be achieved with the classical synthesis in ethylene glycol (EG) and precipitation using strong acids, revealing that the preparation method according to the present invention leads to nanoparticles that exhibit different chemical properties. In FIG. 8, NPs synthesized in EG and precipitated by adding a strong acid are shown not to be re-dispersible in MeOH or water (FIG. 8, solvents iii and iv in (a)). In contrast thereto, the NPs obtained by the method according to the present invention are re-dispersible in MeOH and water as well (FIG. 8, solvents iii and iv in (b)).

The stability of the colloidal particles re-dispersed from 'wet' powders is quite outstanding considering that no surfactant or additives besides a base are needed. The solvent is simply added to the wet-powder and stirring or shaking is enough to re-disperse the NPs. Stability is achieved for at least six months for instance in de-ionized water. Due to the stability the re-dispersed colloidal particles can be shipped from one country to another without a change in particle size and preferably without loss of catalytic activity.

4. Dry Powders 4.1 Obtaining Dry Powders

A major drawback in the use of the NPs in the form of 'wet' powders as previously presented is that only a fraction of the NPs is used if the process relies on the natural sedimentation of the NPs, since the collection of the NPs by e.g. centrifugation is easy only for the NPs that naturally sediment. A certain amount of colloidal NPs remains in the supernatant, giving it a brown colour. To ensure that all synthesized NPs can be used and to obtain a high metal yield, a new strategy to process the nanoparticles was developed as illustrated in FIG. 7. All of the NPs can be collected by distillation and used as 'wet' powders if no extra effort is made to remove the remaining solvent. The thereby obtained product appears like a paste. If extra effort (longer drying process or drying with a flow of gas like $N_2$) is made to dry the 'wet' powder a solvent-free 'dry' powder can be obtained, FIG. 9.

4.2 Re-Dispersion of Dried Nanoparticle Powders

The previous metal nanoparticle dry powder (FIG. 9) can be re-dispersed in solvents like MeOH in which potential support materials such as carbons can also be dispersed. By evaporation of the solvent by e.g. distillation, and washing with e.g. water, a supported catalyst can be obtained. This supported catalyst can itself be dispersed in various solvents to manufacture electrodes and perform electrocatalysis. During the process of synthesis-drying-re-dispersion-deposition the size of the NPs is unchanged (still around 2 nm).

5. Solvent Recovery and Multiple Synthesis

One of the significant benefits of using low boiling point mono-alcohols is that the solvent can be recovered after particle synthesis in the process of obtaining 'wet' or 'dry' powders and also while performing the NP deposition onto a support. The recovered solvent can then be re-used for the synthesis of NPs. For instance the same synthesis using 0.5 mM Pt, a NaOH/Pt ratio of 20 and a total volume of 80 mL can be performed by irradiating the vessel connected to a reflux system with a microwave power of 100 W for 20 min. This procedure can be performed several times in a row. After each synthesis the reaction mixture was distilled, the NPs obtained were re-dispersed in water and the solvent was recovered and then re-used for the next synthesis. The achieved solvent recovery is higher than 94% without further optimization of the process. In all cases the NPs can be re-dispersed in water. Re-using the solvent does not affect the size of the NPs obtained as illustrated in FIG. 10.

6. Accelerating Reaction Time

The synthesis of Pt NPs can be accelerated if instead of using an untreated platinum precursor the precursor is pre-treated by exposition to UV irradiation after dissolving but prior to the addition of a base. This exposure to UV makes the solution of platinum (without NaOH) turn from orange to red. The same happens if the untreated solution of Pt is left at room light for sufficient time. UV-vis adsorption confirms that the Pt(IV) precursor is consumed and forms a Pt(II) species. These simple processes allow enhancing the reaction rate by a factor of 3 to 5 (see FIG. 11).

The same observation could be made using EtOH as solvent, wherein the increase of the reaction rate is less pronounced. This is important since the conversion to Pt NPs in larger volumes (80 mL) usually takes longer (approx. 20 min) to be completed than in smaller volumes. This problem can be overcome by the approach described here. This process of using 'old' or 'aged' precursor does not change the size of the NPs or their re-dispersion properties (FIG. 12). This is then showing that the method according to the present invention is also not sensitive to the age/status of the precursor used which makes it a really robust method.

Example 2

Further Precious Metal Nanoparticles

1. Palladium (Pd) Nanoparticles

For the synthesis of Pd NPs the same conditions can be used when using $PdCl_2$ as precursor. In this specific example the final concentration of precursor in the reaction mixture is 0.5 mM, the NaOH/Pd ratio is typically 20 and the solvent is a MeOH:$H_2O$ mixture (20:80) with a total volume of 80 mL. The mixture is heated up until boiling under reflux with a microwave oven for 15 min at 100 W. In this way a stable Pd nanoparticle (size approx. 2-5 nm) dispersion is obtained with a lifetime of at least two weeks before sedimentation can be observed.

For the synthesis of Pd NPs the same conditions can be used when using $Pd(NO_3)_2$ as precursor. In this specific example the final concentration of precursor in the reaction mixture is 0.5 mM, the NaOH/Pd ratio is 20 and the solvent is a MeOH:$H_2O$ mixture (25:75) with a total volume of 8 mL. The reaction mixture is heated up until boiling under reflux with a microwave oven for 90 seconds at 100 W. In this way a stable Pd nanoparticle (size approx. 5 nm) dispersion is obtained.

2. Ruthenium (Ru) Nanoparticles

For the synthesis of Ru NPs the same conditions can be used, this time the precursor is $RuCl_3 \cdot xH_2O$. The final concentration of precursor in the reaction mixture is 2.5 mM, the NaOH/Pt ratio is typically 20 and the solvent is EtOH with a total volume of 80 mL. The reaction mixture is heated up and refluxed with a microwave oven for 20 min at 100 W, reaching the boiling point of EtOH at 78° C. The NPs obtained are in the range 1.5-2 nm in size. The NPs can be re-dispersed in a variety of solvents.

3. Platinum/Ruthenium (PtRu) Nanoparticles

The PtRu bi-metallic NPs in a ratio Pt:Ru of approx. 50:50 are obtained by mixing $RuCl_3 \cdot xH_2O$ and $H_2PtCl_6 \cdot 6H_2O$ to get a final concentration of 1.25 mM of each precursor in 80 mL of EtOH. The ratio of NaOH to metal precursor is typically 20. The reaction mixture is heated up and refluxed with a microwave oven for 20 min at 100 W, reaching then the boiling point of EtOH at 78° C. The size of the NPs is 1.5-2 nm. The NPs can be re-dispersed in a variety of solvents.

4. Iridium (Ir) Nanoparticles

For the synthesis of Ir NPs the same conditions can be used, this time the precursor is $IrCl_3 \cdot xH_2O$. The final concentration in the reaction mixture is 2.5 mM, the NaOH/Pt ratio is typically 20 and the solvent is MeOH or EtOH with a total volume of 80 mL. The reaction mixture is heated up and refluxed with a microwave oven for 10 min at 100 W reaching then the boiling point of EtOH at 78° C. or MeOH around 65° C. The NPs obtained are in the range 1.5 nm in size. The NPs can be re-dispersed in a variety of solvents.

5. Platinum/Iridium (PtIr) Nanoparticles

The PtIr bi-metallic NPs in a ratio Pt:Ru of approx. 50:50 are obtained by mixing $IrCl_3 \cdot xH_2O$ and $H_2PtCl_6 \cdot 6H_2O$ to get a final concentration of 1.25 mM of each precursor in 80 mL of MeOH.

The ratio of NaOH to metal precursor is typically 20. The reaction mixture is heated up and refluxed in a microwave oven for 20 min at 100 W reaching then the boiling point of MeOH at 65° C. The size of the NPs is 1.5-2 nm.

6. Platinum/Copper (PtCu) Nanoparticles

The PtCu bi-metallic NPs with a Pt:Cu ratio of approx. 50:50 are obtained by mixing $CuSO_4$ and $H_2PtCl_6 \cdot 6H_2O$ to get a final concentration of 2.5 mM of each precursor in 80 mL of MeOH. The ratio of NaOH to metal precursor is typically 20. The reaction mixture is heated up and refluxed with a microwave oven for 15 min at 100 W reaching then the boiling point of MeOH at 65° C. The size of the NPs is 2-4 nm. The NPs re-dispersed in MeOH are stable for at least six months and can be deposited on carbon by solvent evaporation without observing a change in size between the day they were synthesized and the day they were immobilised on a support several months later.

7. Platinum/Tin (PtSn) Nanoparticles

The PtSn bi-metallic NPs with a Pt:Sn ratio of approx. 50:50 are obtained by mixing $SnCl_2$ and $H_2PtCl_6 \cdot 6H_2O$ to get a final concentration of 2.5 mM of each precursor in 80 mL of MeOH. The ratio of NaOH to metal precursor is typically 20. The reaction mixture is heated up and refluxed with a microwave oven for 10 min at 100 W reaching then the boiling point of MeOH at 65° C. The size of the NPs is 2-4 nm.

8. Platinum/Cobalt (PtCo) Nanoparticles

The PtCo bi-metallic NPs with a Pt:Co ratio of approx. 50:50 are obtained by mixing $CoCl_2 \cdot 6H_2O$ and $H_2PtCl_6 \cdot 6H_2O$ to get a final concentration of 2.5 mM of each precursor in 80 mL of MeOH. The ratio of NaOH to precursor is typically 20. The reaction mixture is heated up and refluxed with a microwave oven for 10 min at 100 W reaching then the boiling point of MeOH at 65° C. (EtOH at 78° C.). The size of the NPs is around 2 nm.

9. Platinum/Yttrium (PtY) Nanoparticles

The PtY bi-metallic NPs with a Pt:Y ratio of approx. 50:50 are obtained by mixing $YCl_3 \cdot 6H_2O$ and $H_2PtCl_6 \cdot 6H_2O$ to get a final concentration of 1.25 mM of each precursor in 80 mL of MeOH (EtOH). The ratio of NaOH to metal precursor is typically 20. The reaction mixture is heated up and refluxed with a microwave oven for 30 (10) min at 100 W reaching then the boiling point of MeOH at 65° C. (EtOH at 78° C.). The size of the NPs is about 2 (1.8) nm.

10. Platinum/Nickel (PtNi) Nanoparticles

The PtNi bi-metallic NPs with a Pt:Ni ratio of approx. 50:50 are obtained by mixing $NiCl_2$ and $H_2PtCl_6 \cdot 6H_2O$ to get a final concentration of 1.25 mM of each precursor in 80 mL of MeOH (EtOH). The ratio of NaOH to metal precursor is typically 20. The reaction mixture is heated up and refluxed with a microwave oven for 30 (10) min at 100 W reaching then the boiling point of MeOH at 65° C. (EtOH at 78° C.). The size of the NPs is about 1.5 (2) nm.

11. Platinum/Iron (PtFe) Nanoparticles

The PtFe bi-metallic NPs with a Pt:Fe ratio of approx. 50:50 are obtained by mixing $FeCl_3$ and $H_2PtCl_6 \cdot 6H_2O$ to get a final concentration of 1.25 mM of each precursor in 80 mL of MeOH (EtOH). The ratio of NaOH to metal precursor is typically 20. The reaction mixture is heated up and refluxed with a microwave oven for 15 (10) min at 100 W reaching the boiling point of MeOH at 65° C. (EtOH at 78° C.). The size of the NPs is about 1.5 (2) nm.

Example 3

One-Pot Synthesis of Supported Nanoparticles

For the preparation of NPs in ethanol a platinum precursor salt ($H_2PtCl_6$) was dissolved in an alkaline solution of ethanol (FIG. 13a)). The final concentration of platinum in the reaction mixture was 2.5 mM, the NaOH/Pt ratio was 20 with a total volume of 80 mL. The reaction mixture was heated up using a micro-wave oven with a power of 100 W for 10 minutes. Since the boiling temperature of ethanol is reached a reflux condenser was used.

For the one-pot synthesis of the NPs on a carbon support the same experimental conditions were used but 30 mg of carbon black (Vulcan XC72R) were added to the mixture. The solution was irradiated with a microwave power of 100 W for 20 minutes. The reaction mixture so obtained was distilled to remove the solvent and to ensure immobilisation of the NPs on the carbon support (FIG. 13b)).

Example 4

Properties of Supported Nanoparticles

The reaction mixtures contained 8 mL solution with 0.5 mM $H_2PtCl_6$ complex and a NaOH/Pt ratio of 20. To the solution about 10 mg of alumina (Buehler Micropolish II deagglomerated gamma alumina 50 nm) was added. The reaction mixture was heated up under reflux conditions using a microwave power of 100 W for 20 minutes. After the reaction the solution was centrifuged for 5 minutes at 2400 relative centrifugal force. This allows separating the brown supernatant comprising colloidal Pt NPs and the alumina partially covered with Pt NPs. TEM revealed immobilisation of nanoparticles on the alumina support (FIG. 14).

The supported NPs can be washed off the support using a mono-alcohol like isopropanol and show the same re-dispersibility and stability properties as NPs obtained in the absence of a support. The particle size of the NPs is maintained after removal from the support and the obtained colloidal dispersions are stable for at least 3 weeks.

Example 5 (Comparative)

For Rh the synthesis does not work if the same conditions are used with $RhCl_3 \cdot xH_2O$ as precursor. In this specific example the final concentration of precursor is 2.5 mM, the NaOH/Rh ratio is typically 20 and the solvent is EtOH or MeOH with a total volume of 10 mL. The reaction mixture is heated up and refluxed using an oil bath heated to 90° C. The reaction time was 15 min. After a few minutes a black precipitate is formed. This precipitate cannot be re-dispersed in any of the solvents that can be used to re-disperse e.g. Pt NPs that were synthesized by the method according to the present invention. If water is added to the reaction mixture (e.g. $MeOH:H_2O=80\%:20\%$) the reaction rate is reduced, but the outcome of the preparation is the same as for a synthesis without water.

Example 6 (Comparative)

For the synthesis of Pt NPs 2 mL of a 20 mM solution of $H_2PtCl_6 \cdot 6H_2O$ in acetone was mixed with 14 mL of a 57 mM solution of NaOH and 64 mL of acetone were added to the previous. The reaction mixture is heated up and refluxed with a microwave oven for 10 min.

A similar experiment was performed using 2 mL of a 20 mM solution of $H_2PtCl_6 \cdot 6H_2O$ in acetone and 78 mL of a 10 mM solution of NaOH. The reaction mixture was heated up and refluxed with a microwave oven for 15 min.

Upon heating up the solution gets darker in both cases. TEM analysis confirms the formation of NPs.

In the case of synthesis with ketone the obtained NPs are not stable. However, they can be re-dispersed in alkaline water and methanol. The fact that acetone undergoes a strong colour change in the presence of NaOH is indicative of possible side-reactions and/or polymerization. The NPs obtained using acetone as a solvent may well be protected by adsorbates that have a molar weight superior to 100 g/mol.

Example 7 (Comparative)

Pd NPs prepared according to U.S. Pat. No. 8,962,512 B1 are compared to Pd NPs prepared by the method according to the present invention. The comparison also includes Pt NPs prepared according to the recipe suggested in U.S. Pat. No. 8,962,512 B1 but using the inorganic precursors $PdCl_2$ or $H_2PtCl_6 \cdot H_2O$ instead of $Pd(OAc)_2$.

ethanol (c), wherein the NPs prepared according to the method of the present invention are obtained as a stable colloidal dispersion (d).

The invention claimed is:

1. A method for preparing a colloidal dispersion of precious metal nanoparticles, the method comprising:
   a) providing at least one inorganic precursor for the precious metal nanoparticles, a mono-alcoholic solvent system comprising at least one mono-alcohol, and a base, wherein the at least one inorganic precursor comprises a precious metal selected from the group consisting of Pt, Pd, Ir, Ru, and combinations thereof, and the mono-alcohol of the mono-alcoholic solvent system is methanol, ethanol, propanol, or a combination thereof,
   b) mixing the at least one inorganic precursor, the mono-alcoholic solvent system and the base in the absence of polymers, ligands, capping agents and surfactants, to obtain a reaction mixture, thereby fully reducing the at least one inorganic precursor with the mono-alcoholic solvent system in a one-step process, and
   c) obtaining the colloidal dispersion of precious metal nanoparticles via the one-step process, the precious metal nanoparticles being free of organic adsorbates having a molar weight above 100 g/mol.

2. The method according to claim 1, wherein in step a) the at least one inorganic precursor comprises a first inorganic precursor for the precious metal nanoparticles and a second inorganic precursor for the precious metal nanoparticle, and the first inorganic precursor comprises a first metal selected from the group consisting of Pt, Pd, Ir, Ru, and combinations thereof, wherein the first metal in the first inorganic precursor differs from a second metal in the second inorganic precursor, so as to obtain a colloidal dispersion of bi-metallic precious metal nanoparticles.

TABLE 1

Comparison of Pt nanoparticles prepared by different methods

| | Synthesis according to U.S. Pat. No. 8,962,512 B1 | | | Synthesis according to the method of the present invention | |
|---|---|---|---|---|---|
| NPs | Pd | Pd | Pt | Pd | Pt |
| Precursors | $Pd(OAc)_2$ | $PdCl_2$ | $H_2PtCl_6 \cdot 6H_2O$ | $PdCl_2$ | $H_2PtCl_6 \cdot 6H_2O$ |
| Solvent | MeOH | MeOH | MeOH | MeOH:$H_2O$ (20:80) | MeOH:mQ (20:80) |
| Metal precursor concentration | 1.5 mM | 1.5 mM | 1.5 mM | 2.5 mM | 0.5 mM or 2.5 mM |
| NaOH/Pt | 0 | 0 | 0 | 20 | 20 |
| Condition | Room condition | Room condition | Room condition | Thermal treatment | Thermal treatment |
| Time to see a colour change indicative of NP formation | 30 min | Still yellow after 2 months. No clear NPs formation | 1-2 days | Few minutes | 10-20 minutes |
| Stability of the colloidal dispersion | Sedimentation starts after 1-2 days and NPs agglomerate | — | Not stable and precipitation (can be seen after 2 days, clearly not stable after 2 months) | Stable for at least 2-3 weeks (after 10 days the NPs are still individual and the colloidal dispersion remains stable) | Stable for at least 3 weeks |
| Re-dispersibility of the NPs    MeOH | NO | — | NO | Not investigated | YES for months |
| EtOH | NO | — | NO | Not investigated | YES for months |

Example 8 (Comparative)

Cited reference US 2013/0264198 A1 discloses a method for producing precious metal nanoparticles using ethanol as solvent and reductant. To demonstrate the advantageous properties of the precious metal nanoparticles in the colloidal dispersion obtained by the method according to the present invention in comparison to the precious metal nanoparticles obtained by the method described in US 2013/0264198 A1 Ru NPs were prepared according to the respective methods. As evident from FIG. 15, the NPs prepared according to the method of US 2013/0264198 A1 precipitate completely (a) and cannot be dispersed in water (b) or 3. The method according to claim 1, wherein the base is selected from lithium hydroxide (LiOH), sodium hydroxide (NaOH), potassium hydroxide (KOH) or a mixture thereof.

4. The method according to claim 1, wherein the mono-alcoholic solvent system comprises a mixture of the at least one mono-alcohol and water.

5. The method according to claim 4, wherein the ratio (volume:volume) of the at least one mono-alcohol to the water in the mono-alcoholic solvent system is 100:0 to 5:95.

6. The method according to claim 1, wherein in step a) a support is further provided and step b) is conducted in the presence of the support, so as to obtain in step c) supported precious metal nanoparticles free of organic adsorbates having a molar weight above 100 g/mol.

7. The method according to claim 1, wherein in step c) centrifugation and/or distillation is carried out so as to obtain solid precious metal nanoparticles.

8. A method for preparing a colloidal dispersion of precious metal nanoparticles, the method comprising:
   combining, in the absence of polymers, ligands, capping agents, and surfactants, an inorganic precursor comprising a precious metal selected from the group consisting of Pt, Pd, Ir, Ru, and combinations thereof, a mono-alcoholic solvent system comprising a mono-alcohol selected from the group consisting of methanol, ethanol, propanol, and combinations thereof, and a base to form a reaction mixture in a one-step process;
   fully reducing the inorganic precursor in the reaction mixture; and
   forming via the one-step process the colloidal dispersion of precious metal nanoparticles comprising precious metal nanoparticles reduced from the mono-alcoholic solvent system and being free of organic adsorbates having a molar weight above 100 g/mol.

9. The method according to claim 8, further comprising at least one of heating the reaction mixture or irradiating the reaction mixture with ultraviolet light during the mixing.

10. The method according to claim 7, further comprising re-dispersing the solid precious metal nanoparticles in an aqueous media or an organic solvent, wherein each have a pH ranging from 2.5 to 12.5.

* * * * *